US007699353B2

(12) United States Patent
Smith

(10) Patent No.: US 7,699,353 B2
(45) Date of Patent: Apr. 20, 2010

(54) COMPLIANT SPLICE

(75) Inventor: Ron Smith, Seabrook, TX (US)

(73) Assignee: Deep Down, Inc., Channelview, TX (US)

( * ) Notice: Subject to any disclaimer, the term of this patent is extended or adjusted under 35 U.S.C. 154(b) by 1249 days.

(21) Appl. No.: 10/841,593

(22) Filed: May 7, 2004

(65) Prior Publication Data

US 2010/0052316 A1    Mar. 4, 2010

(51) Int. Cl.
*F16L 27/00*    (2006.01)
(52) U.S. Cl. .................. 285/121.1; 285/114; 405/167
(58) Field of Classification Search ................ 285/115, 285/114, 121.6, 121.1, 272; 166/242.2; 405/167, 405/168.1, 168.3, 170; 439/31
See application file for complete search history.

(56) References Cited

U.S. PATENT DOCUMENTS

| 3,128,825 | A | * | 4/1964 | Blagg | 166/55 |
|---|---|---|---|---|---|
| 4,337,970 | A | * | 7/1982 | Gunderson | 285/121.6 |
| 4,398,331 | A | * | 8/1983 | Inao | 29/890.14 |
| 4,411,409 | A | * | 10/1983 | Smith | 254/134.3 FT |
| 4,753,291 | A | * | 6/1988 | Smith et al. | 166/65.1 |
| 4,842,059 | A | * | 6/1989 | Tomek | 166/65.1 |
| 5,192,166 | A | * | 3/1993 | Persson | 405/168.1 |
| 5,506,818 | A | * | 4/1996 | Johnston | 367/144 |
| 5,590,915 | A | * | 1/1997 | Recalde | 285/119 |
| 6,069,841 | A | * | 5/2000 | Johnston | 367/20 |
| 6,193,216 | B1 | * | 2/2001 | Holen et al. | 254/134.3 FT |
| 6,227,292 | B1 | * | 5/2001 | Cooper | 166/241.5 |
| 6,305,476 | B1 | * | 10/2001 | Knight | 166/385 |
| 6,402,539 | B1 | * | 6/2002 | Toth et al. | 439/367 |
| 6,484,801 | B2 | * | 11/2002 | Brewer et al. | 166/65.1 |
| 6,543,965 | B2 | * | 4/2003 | Toth et al. | 405/158 |
| 6,679,323 | B2 | * | 1/2004 | Vargervik et al. | 166/55.1 |
| 6,761,574 | B1 | * | 7/2004 | Song et al. | 439/320 |
| 7,131,497 | B2 | * | 11/2006 | Helms et al. | 166/381 |
| 7,318,479 | B2 | * | 1/2008 | Williams | 166/341 |
| 7,467,662 | B2 | * | 12/2008 | Smith | 405/170 |

* cited by examiner

*Primary Examiner*—David E Bochna
(74) *Attorney, Agent, or Firm*—Husch Blackwell Sanders LLP

(57) ABSTRACT

A method including providing a first umbilical, coupling an end of the first umbilical to a first end of a compliant splice system, providing a second umbilical, and coupling an end to the second umbilical to a second end of the compliant splice system.

1 Claim, 39 Drawing Sheets

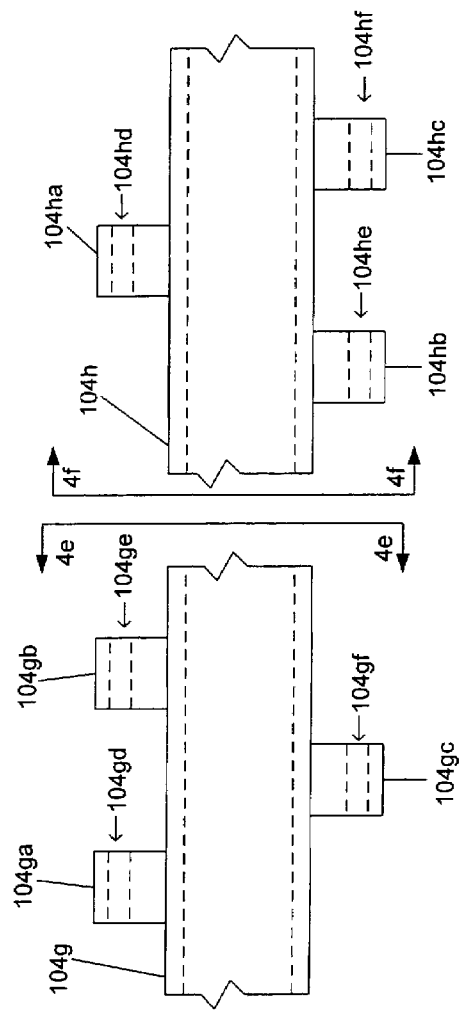
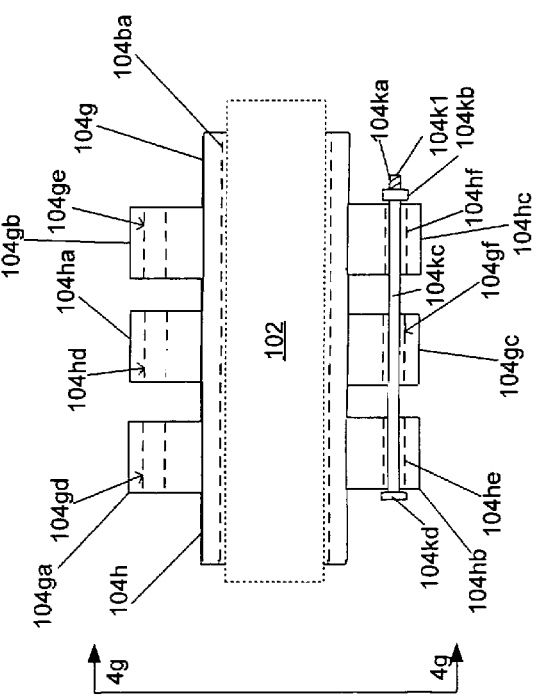
Figure 4b
Figure 4c
Figure 4d

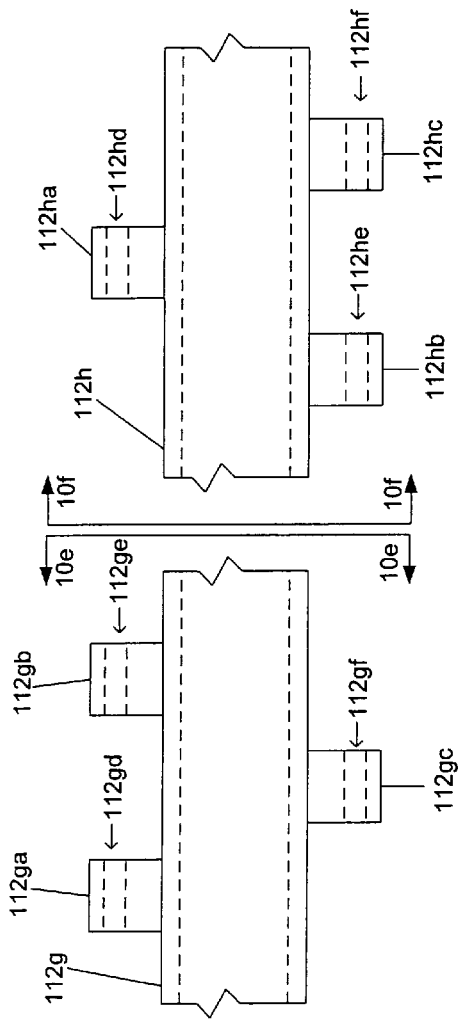
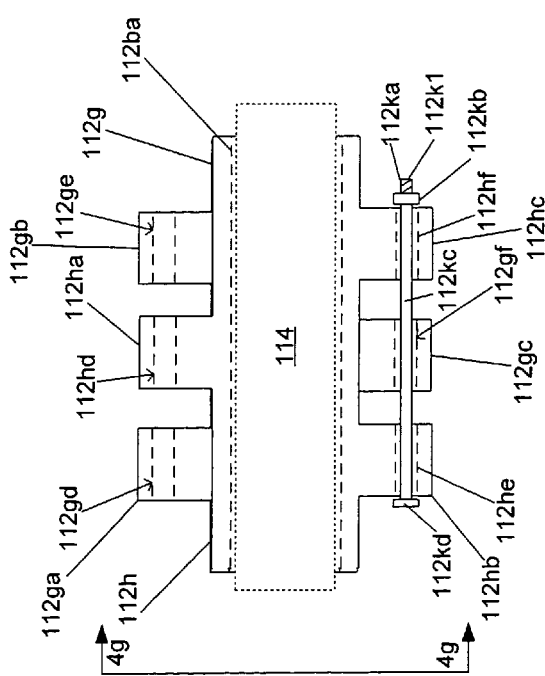
Figure 10b
Figure 10c
Figure 10d

COMPLIANT SPLICE

SUMMARY OF THE INVENTION

According to one aspect of the present invention, a method including providing a first umbilical, coupling an end of the first umbilical to a first end of a compliant splice system, providing a second umbilical, and coupling an end to the second umbilical to a second end of the compliant splice system.

According to another aspect of the present invention, an apparatus for coupling a first umbilical to a second umbilical, including a first attachment mechanism for attaching the apparatus to the first umbilical, a second attachment mechanism for attaching the apparatus to the second umbilical, and a movable mechanism coupled to the first attachment mechanism and the second attachment mechanism, allowing relative movement between the first umbilical and the second umbilical.

According to another aspect of the present invention, a system including a movable mechanism, a first umbilical, a first attachment mechanism for attaching the movable mechanism to the first umbilical, a second umbilical, a second attachment mechanism for attaching the movable mechanism to the second umbilical, and wherein the movable mechanism allows relative movement between the first umbilical and the second umbilical.

According to another aspect of the present invention, an apparatus for coupling a first umbilical to a second umbilical, including a first attachment means for attaching the apparatus to the first umbilical, a second attachment means for attaching the apparatus to the second umbilical, and a movable means coupled to the first attachment means and the second attachment means, allowing relative movement between the first umbilical and the second umbilical.

According to another aspect of the present invention, a method including providing a first umbilical, exposing at least one conduit of the first umbilical, providing a second umbilical, exposing at least one conduit of the second umbilical, connecting the at least one conduit of the first umbilical to the at least one conduit of the second umbilical with a connection, and placing the connection within a compliant housing.

According to another aspect of the present invention, a method including providing a first umbilical, coupling an end of the first umbilical to a first end of a compliant splice system, providing a second umbilical, coupling an end of the second umbilical to a second end of the compliant splice system, coupling at least one conduit within the first umbilical to at least one conduit within the second umbilical, rolling the first umbilical, the compliant splice system, and the second umbilical onto a reel, placing the reel on a ship, lowering the first umbilical, the compliant splice system, and the second umbilical from the reel, over a chute on the ship, and into water, and attaching a mud mat assembly to the compliant splice system.

According to another aspect of the present invention, an apparatus for coupling a first umbilical to a second umbilical, including a first attachment mechanism for attaching the apparatus to the first umbilical, a second attachment mechanism for attaching the apparatus to the second umbilical, a movable mechanism coupled to the first attachment mechanism and the second attachment mechanism, allowing relative movement between the first umbilical and the second umbilical, wherein the movable mechanism comprises a plurality of joints which are adapted to rotate relative to one another, wherein the first attachment mechanism comprises an armor pot, wherein the second attachment mechanism comprises an armor pot, further comprising at least one bend restrictor about the first umbilical adjacent the first attachment mechanism, further comprising at least one bend restrictor about the second umbilical adjacent the second attachment mechanism, further comprising an adapter to connect the at least one bend restrictor to the first attachment mechanism, further comprising an adapter to connect the at least one bend restrictor to the second attachment mechanism, wherein the movable mechanism comprises a mid joint hingedly connected to a first end joint on a first end, and hingedly connected to a second end joint on a second end, and wherein the first attachment mechanism is connected to the first end joint, and the second attachment mechanism is connected to the second end joint.

According to another aspect of the present invention, a system including a movable mechanism, a first umbilical, a first attachment mechanism for attaching the movable mechanism to the first umbilical, a second umbilical, a second attachment mechanism for attaching the movable mechanism to the second umbilical, wherein the movable mechanism allows relative movement between the first umbilical and the second umbilical, wherein the movable mechanism comprises a plurality of joints which are adapted to rotate relative to one another, wherein the first attachment mechanism comprises an armor pot, wherein the second attachment mechanism comprises an armor pot, further comprising at least one bend restrictor about the first umbilical adjacent the first attachment mechanism, further comprising at least one bend restrictor about the second umbilical adjacent the second attachment mechanism, further comprising an adapter to connect the at least one bend restrictor to the first attachment mechanism, further comprising an adapter to connect the at least one bend restrictor to the second attachment mechanism, wherein the movable mechanism comprises a mid joint hingedly connected to a first end joint on a first end, and hingedly connected to a second end joint on a second end, and wherein the first attachment mechanism is connected to the first end joint, and the second attachment mechanism is connected to the second end joint.

According to another aspect of the present invention, an apparatus for coupling a first umbilical to a second umbilical, including a first attachment means for attaching the apparatus to the first umbilical, a second attachment means for attaching the apparatus to the second umbilical, a movable means coupled to the first attachment means and the second attachment means, allowing relative movement between the first umbilical and the second umbilical, a means for coupling at least one conduit within the first umbilical to at least one conduit within the second umbilical, a means for coupling at least one conduit within the first umbilical to a connector within the movable means, and coupling at least one conduit within the second umbilical to the connector within the movable means, a means for rolling the first umbilical, the apparatus, and the second umbilical onto a reel, a means for placing the reel on a ship, a means for lowering the first umbilical, the apparatus, and the second umbilical from the reel, over a chute on the ship, and into water, a means for attaching a mud mat assembly to the apparatus, wherein the movable means comprises a plurality of joints which are adapted to rotate relative to one another, wherein the movable means comprises a mid joint hingedly connected to a first end joint on a first end, and hingedly connected to a second end joint on a second end, and wherein the first attachment means is connected to the first end joint, and the second attachment means is connected to the second end joint.

According to another aspect of the present invention, a method including providing a first umbilical, exposing at least one conduit of the first umbilical, providing a second umbilical, exposing at least one conduit of the second umbilical, connecting the at least one conduit of the first umbilical to the at least one conduit of the second umbilical with a connection, placing the connection within a compliant housing, coupling the at least one conduit of the first umbilical to a connector within the compliant housing, and coupling the at least one conduit of the second umbilical to the connector within the compliant housing, rolling the first umbilical, the compliant housing, and the second umbilical onto a reel, placing the reel on a ship, lowering the first umbilical, the compliant housing, and the second umbilical from the reel, over a chute on the ship, and into water, attaching a mud mat assembly to the compliant housing, and sealing an interface between the first conduit and the compliant housing with a resin, and sealing an interface between the second conduit the compliant housing with a resin.

BRIEF DESCRIPTION OF THE DRAWINGS

FIG. 4b is a side view of a bend restricter arcuate segment.
FIG. 4c is a side view of a bend restricter arcuate segment.
FIG. 4d is a side view of two bend restricter arcuate segments assembled.
FIG. 10b is a side view of a bend restricter arcuate segment.
FIG. 10c is a side view of a bend restricter arcuate segment.
FIG. 10d is a side view of two bend restricter arcuate segments assembled.

DETAILED DESCRIPTION OF THE ILLUSTRATIVE EMBODIMENTS

Figure 1:
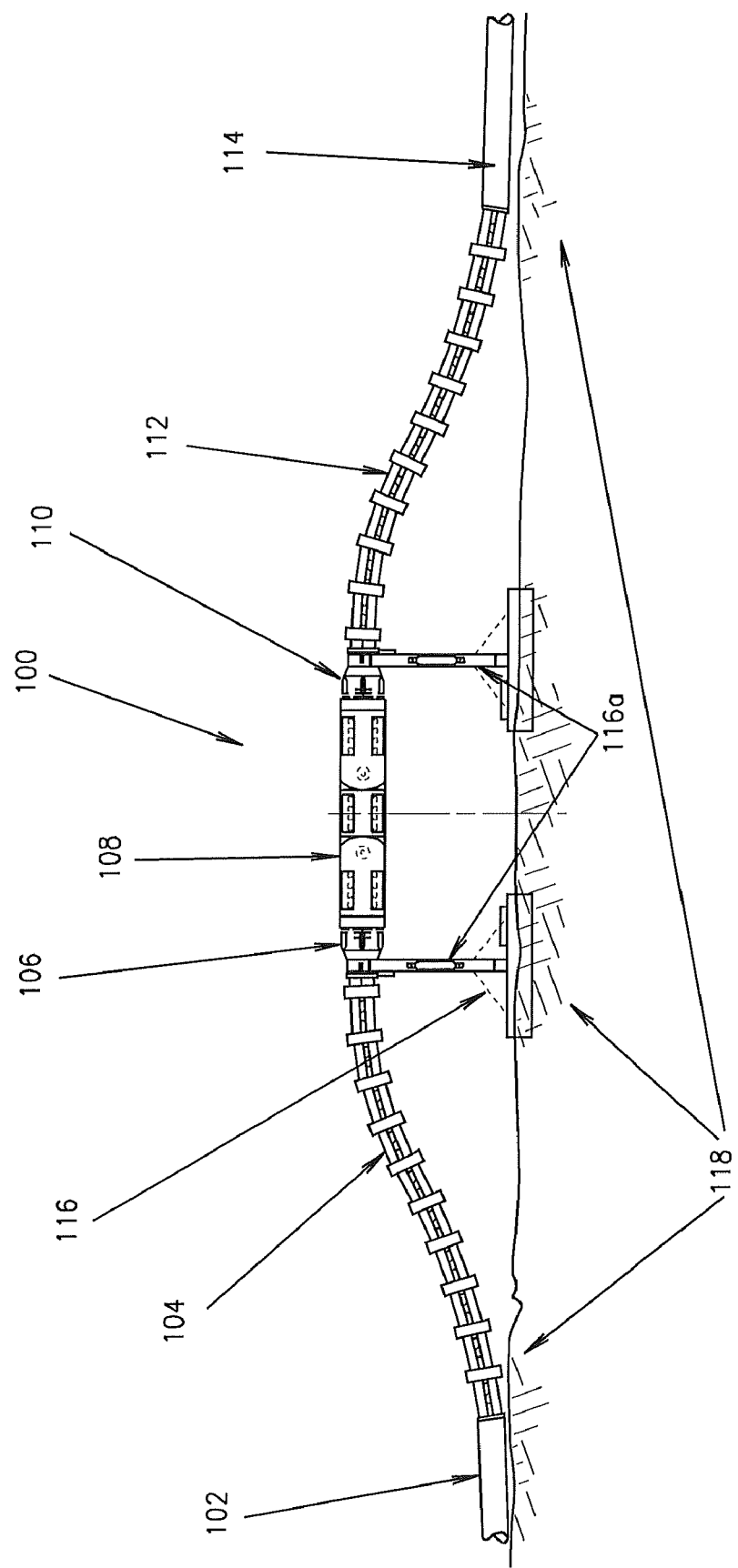
FIG. 1 is a side view illustrating a compliant splice system.

Referring initially to FIGS. 1, 2, 3a, 3b, 4a, 4b, 4c, 4d, 4e, 4f, 4g, 4h, 4i, 4j, 5a, 5b, 6, 7, 8, 9a, 9b, 10a, 10b, 10c, 10d, 10e, 10f, 10g, 10h, 10i, 10j, 11a, 11b, and 12, an exemplary embodiment of splicing system 100 is illustrated.

System 100 includes umbilical 102 that includes protective sheath 102a that defines a passage 102b that receives conduits 102ca, 102cb, 102cc, and 102cd. In an exemplary embodiment, conduits 102ca, 102cb, 102cc, and 102cd may include one or more electrical cables, fiber-optic cables, and/or pipes or hoses for transmitting fluids or gases.

Bend restrictor assembly 104 includes bend restrictor adapter 104a at one end, and bend restrictor elements 104b and 104c coupled end to end, and connected to an end of bend restrictor adapter.

Bend restrictor adapter 104a defines longitudinal passage 104aa, that receives umbilical 102, and includes external flange 104ae at one end, circumferentially spaced structural supports 104ab, 104ac, and 104ad, and external flange 104d at the other end defining circumferentially spaced mounting holes 104da, 104db, 104dc, 104dd, 104de, and 104df.

Bend restrictor 104b defines longitudinal passage 104ba, that receives umbilical 102, includes internal annular groove 104bb at one end, that receives external flange 104ae of bend restrictor adapter 104a, includes external flange 104bc at the other end, and includes front arcuate segment 104g and back arcuate segment 104h. Front arcuate segment 104g includes top longitudinally spaced hinges 104ga and 104gb and bottom hinge 104gc which define longitudinal openings 104gd, 104ge, and 104gf, respectively. Back arcuate segment 104h includes bottom longitudinally spaced hinges 104hb and 104hc which receive bottom hinge 104gc of front arcuate segment 104g between them, and top hinge 104ha which is received between top longitudinally spaced hinges 104ga and 104gb, which hinges 104ha, 104hb and 104hc define longitudinal openings 104hd, 104he, and 104hf, respectively. Longitudinal openings 104gd, 104hd, and 104ge receive pin 104k1 to hingedly connect front arcuate segment 104g and back arcuate segment 104h about umbilical 102. Longitudinal openings 104*he*, 104*gf*, and 104*hf* also receive pin 104*k*2 to hingedly connect front arcuate segment 104*g* and back arcuate segment 104*h* about umbilical 102. Pin 104*k*1 includes threaded portion 104*ka* at one end, nut 104*kb*, shaft 104*kc*, and head 104*kd* at the other end. In an exemplary embodiment, pin 104*k*2 is substantially identical in design and operation to pin 104*k*1.

Bend restrictor 104*c* defines longitudinal passage 104*ca*, that receives umbilical 102, and includes internal annular groove 104*cb* at one end that receives external flange 104*bc* of bend restrictor 104*b*. In an exemplary embodiment, bend restrictor 104*c* is substantially identical in design and operation to bend restrictor 104*b*.

Armor pot 106 includes housing assembly 106*a* that defines longitudinal passage 106*aa* having axis 106*ab*, that receives umbilical 102, defines internal annular recess 106*b* at one end, and includes flange 106*c* at one end defining mounting holes 106*ca*, 106*cb*, 106*cc*, 106*cd*, 106*ce*, and 106*cf*, includes flange 106*e* at another end defining mounting holes 106*fa*, 106*fb*, 106*fc*, 106*fd*, 106*fe*, 106*ff*, 106*fg*, and 106*fh* and defining mounting hole 106*g*, and includes intermediate support brackets 106*h* defining holes 106*da* and 106*db*.

Disc shaped potting dam 107 defines conduit receiving holes 107*a* and mounting holes 107*ba*, 107*bb*, 107*bc*, 107*bd* to receive connectors 107*ca*, 107*cb*, and 107*cc*, and is received within recess 106*b* of armor pot 106.

Compliant splice 108 includes mid joint 108*a* and end joints 108*b* and 108*c*, that are pivotally coupled to opposite ends of mid joint.

Mid joint 108*a* includes top section 108*d* including plate 108*da* defining visual access holes 108*db* and including identification 108*dc*, that includes flange 108*dd* on one side defining connection holes 108*de*, and includes flange 108*df* on another side defining connection holes (not shown). Flanges 108*dd* and 108*df* extend from plate 108*da* in an orthogonal direction and are rigidly connected to plate 108*da* by external welds 108*dg* and internal welds 108*dh*. Side section 108*e* defines connection holes 108*ab*, and includes swivel bars 108*ad* at each end defining connection holes 108*ac* and including curved edges 108*ae*. Side section 108*f* defines connection holes 108*ab* and includes swivel bars 108*ad* at each end defining connection holes 108*ac* and including curved edges 108*ae*. In an exemplary embodiment, side section 108*e* is substantially identical in design and operation to side section 108*f*. Bottom section 108*g* defines visual access holes 108*ga*, and in an exemplary embodiment, may be substantially identical in design and operation to top section 108*d*. Bolts 108*h* are received within connection holes 108*ab* of side section 108*e* and side section 108*f* and connection holes 108*de* of top section 108*d* and bottom section 108*g* to rigidly attach side section 108*e* and side section 108*f* to top section 108*d* and bottom section 108*g*.

End joint 108*b* includes top section 108*i*, side section 108*j*, side section 108*k*, and bottom section 108*l*. Top section 108*i* includes plate 108*ia* defining visual access holes 108*ib* and including identification 108*ic*, that includes flange 108*id* defining connection holes 108*ie*, and includes flange 108 if defining connection holes (not shown). Flanges 108*id* and 108 if extend from plate 108*ia* in an orthogonal direction, and are rigidly connected to plate 108*ia* by external welds 108*ig* and internal welds 108*ih*. Side section 108*j* defines connection holes 108*n* at one end, defines connection holes 108*ai* in the middle, and includes swivel bar 108*ak* at another end defining connection hole 108*aj*. Side section 108*k* defines connection holes 108*n* at one end, defines connection holes 108*ai* in the middle, and includes swivel bar 108*ak* at another end defining connection hole 108*aj* and including curved edge 108*al*. In an exemplary embodiment, side section 108*j* is substantially identical in design and operation to side section 108*k*. Bottom section 108*l* defines visual access holes 108*la*, and in an exemplary embodiment, may be substantially identical in design and operation to top section 108*i*. Bolts 108*m* are received within connection holes 108*ai* of side section 108*j* and side section 108*k* and connection holes 108*id* to rigidly attach side section 108*j* and side section 108*k* to top section 108*i* and bottom section 108*l*.

End joint 108*c* includes top section 108*p*, side section 108*q*, side section 108*r*, and bottom section 108*s*. Top section 108*p* defines visual access holes 108*pa*, side section 108*r* defines connection hole 108*w* and includes connectors 108*u*. Bolts 108*t* are received within connection holes to rigidly attach side section 108*q* and side section 108*r* to top section 108*p* and bottom section 108*s*. In an exemplary embodiment, end joint 108*c* is substantially identical in design and operation to end joint 108*b*.

Bolts 108*v* are received within connection holes 108*w* on the front and back sides of end joint 108*c* and connection holes 108*ac* on the front and back sides of mid joint 108*a* to hingedly connect end joint 108*c* to mid joint 108*a*, and bolts 108*o* are received within connection holes 108*aj* on the front and back sides of end joint 108*b* and connection holes 108*ac* on the front and back sides of mid joint 108*a* to hingedly connect end joint 108*b* to mid joint 108*a*.

Armor pot 110 includes housing assembly 110*a* that defines longitudinal passage 110*aa* having axis 110*ab*, that receives umbilical 114, defines internal annular recess 110*b* at one end, and includes flange 110*c* at one end defining mounting holes 110*ca*, 110*cb*, 110*cc*, 110*cd*, 110*ce*, and 110*cf*, includes flange 110*e* at another end defining mounting holes 110*fa*, 110*fb*, 110*fc*, 110*fd*, 110*fe*, 110*ff*, 110*fg*, and 110*fh* and defining mounting hole 110*g*, and includes intermediate support brackets 110*h* defining holes 110*da* and 110*db*.

Disc shaped potting dam 111 defines conduit receiving holes 111*a* and mounting holes 111*ba*, 111*bb*, 111*bc*, 111*bd* to receive connectors 111*ca*, 111*cb*, and 111*cc*, and is received within recess 110*b* of armor pot 110.

Bend restrictor assembly 112 includes bend restrictor adapter 112*a* at one end, and bend restrictor elements 112*b* and 112*c* coupled end to end, and connected to an end of bend restrictor adapter.

Bend restrictor adapter 112*a* defines longitudinal passage 112*aa*, that receives umbilical 102, and includes external flange 112*ae* at one end, circumferentially spaced structural supports 112*ab*, 112*ac*, and 112*ad*, and external flange 112*d* at the other end defining circumferentially spaced mounting holes 112*da*, 112*db*, 112*dc*, 112*dd*, 112*de*, and 112*df*.

Bend restrictor 112*b* defines longitudinal passage 112*ba*, that receives umbilical 102, includes internal annular groove 112*bb* at one end, that receives external flange 112*ae* of bend restrictor adapter 112*a*, includes external flange 112*bc* at the other end, and includes front arcuate segment 112*g* and back arcuate segment 112*h*. Front arcuate segment 112*g* includes top longitudinally spaced hinges 112*ga* and 112*gb* and bottom hinge 112*gc* which define longitudinal openings 112*gd*, 112*ge*, and 112*gf*, respectively. Back arcuate segment 112*h* includes bottom longitudinally spaced hinges 112*hb* and 112*hc* which receive bottom hinge 112*gc* of front arcuate segment 112*g* between them, and top hinge 112*ha* which is received between top longitudinally spaced hinges 112*ga* and 112*gb*, which hinges 112*ha*, 112*hb* and 112*hc* define longitudinal openings 112*hd*, 112*he*, and 112*hf*, respectively. Longitudinal openings 112*gd*, 112*hd*, and 112*ge* receive a pin 112k1 to hingedly connect front arcuate segment 112g and back arcuate segment 112h about umbilical 102. Longitudinal openings 112he, 112gf, and 112hf also receive a pin 112k2 to hingedly connect front arcuate segment 112g and back arcuate segment 112h about umbilical 102. Pin 112k1 includes threaded portion 112ka at one end, nut 112kb, shaft 112kc, and head 112kd at the other end. In an exemplary embodiment, pin 112k2 is substantially identical in design and operation to pin 112k1.

Bend restrictor 112c defines longitudinal passage 112ca, that receives umbilical 102, and includes internal annular groove 112cb at one end that receives external flange 112bc of bend restrictor 112b. In an exemplary embodiment, bend restrictor 112c is substantially identical in design and operation to bend restrictor 112b.

Umbilical 114 includes protective sheath 114a that defines a passage 114b that receives conduits 114ca, 114cb, 114cc, and 114cd. In an exemplary embodiment, conduits 114ca, 114cb, 114cc, and 114cd may include one or more electrical cables, fiber-optic cables, and/or pipes or hoses for transmitting fluids or gases.

Mud mat assembly 116 includes anodes 116a that are provided to prevent corrosion of one or more of compliant splice 108, bend restrictor assembly 104, 112, armor pots 106, 110, and/or mud mat assembly 116, includes mud mat 116b, stand 116c connected to mud mat 116b, including receiving mechanism 116d, c-clamp 116e, and attachment mechanism 116f, which secures c-clamp 116e to stand 116c. Mud mat assembly 116 also includes mud mat 116g, stand 116h connected to mud mat 116g, pin assembly 116i and bushing 116j, which includes detent ring pin 116n and pull loop 116o. Tie wraps 116k, release lanyard 116l and release lanyard 116m are included to release pin assembly 116i.

Figure 13:
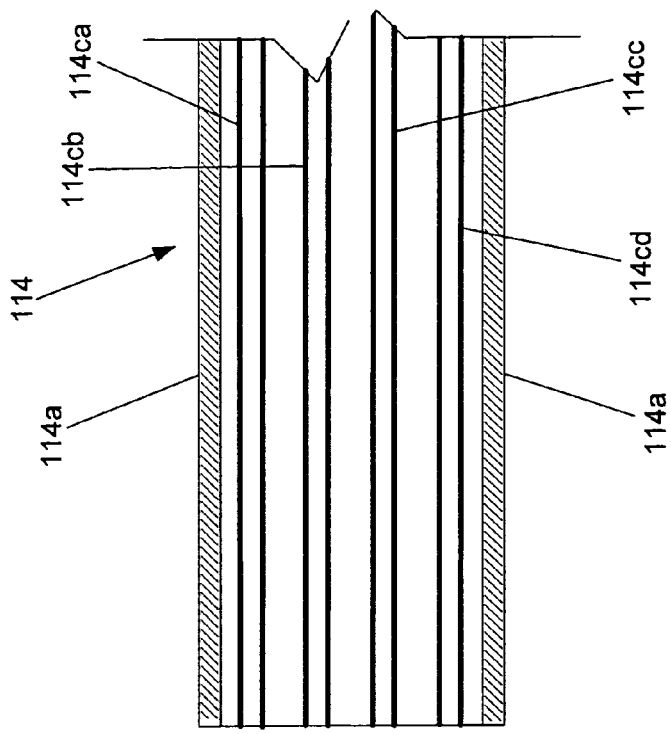
FIG. 13 is a side cross-sectional view of two umbilicals.
Figure 13:
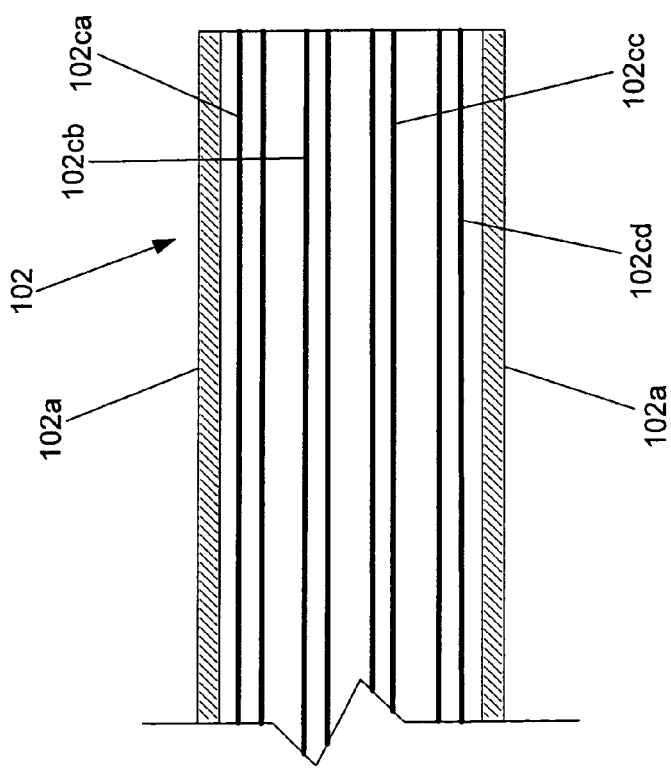

Assembly & Operation:

Referring now to FIGS. 13-21, in an exemplary embodiment, during the assembly of system 100, umbilicals 102 and 114 are provided, as shown in FIG. 13.

Figure 14:
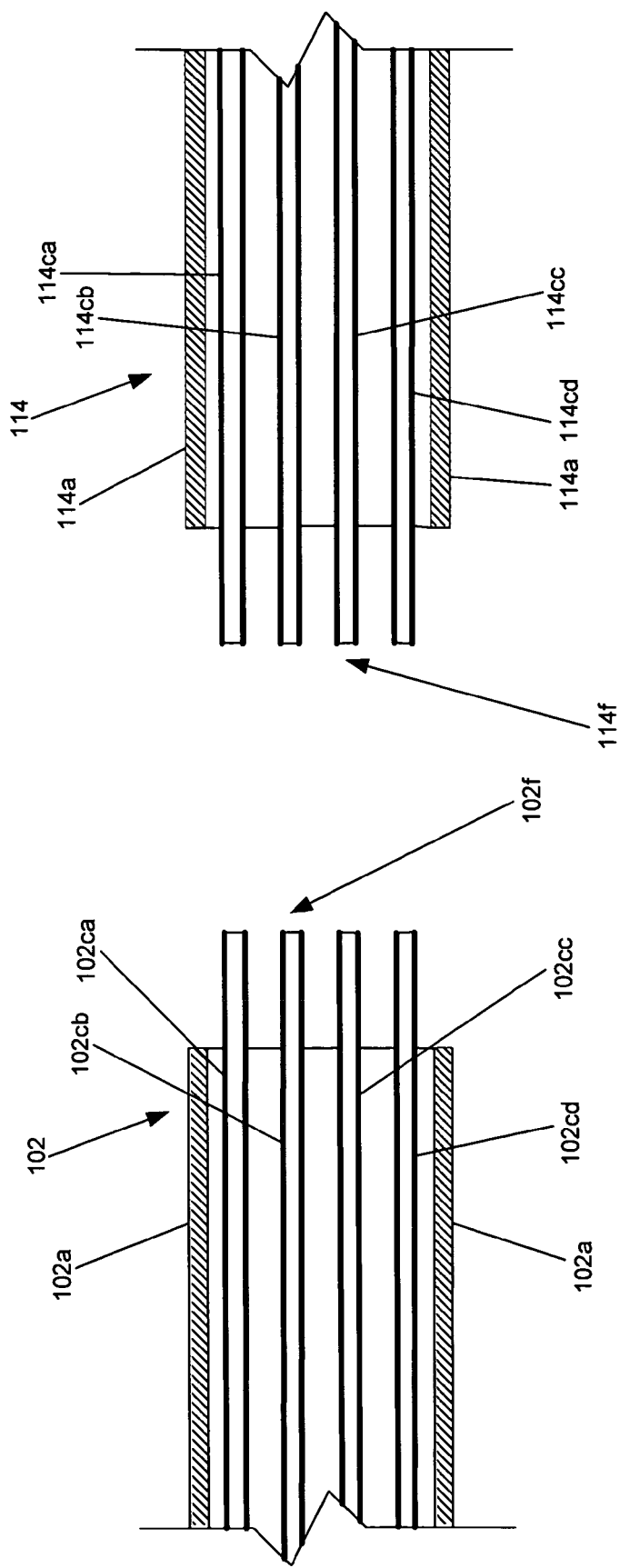
FIG. 14 is a side cross-sectional view of two umbilicals with a portion of their sheathing removed.

Referring to FIG. 14, a portion of protective sheath 102a is then removed to expose a portion of conduit 102ca, conduit 102cb, conduit 102cc, and conduit 102cd; and a portion of protective sheath 114a is removed to expose a portion of conduit 114ca, conduit 114cb, conduit 114cc, and conduit 114cd. This process leaves exposed portions 102l and exposed portions 114f.

Figure 15:
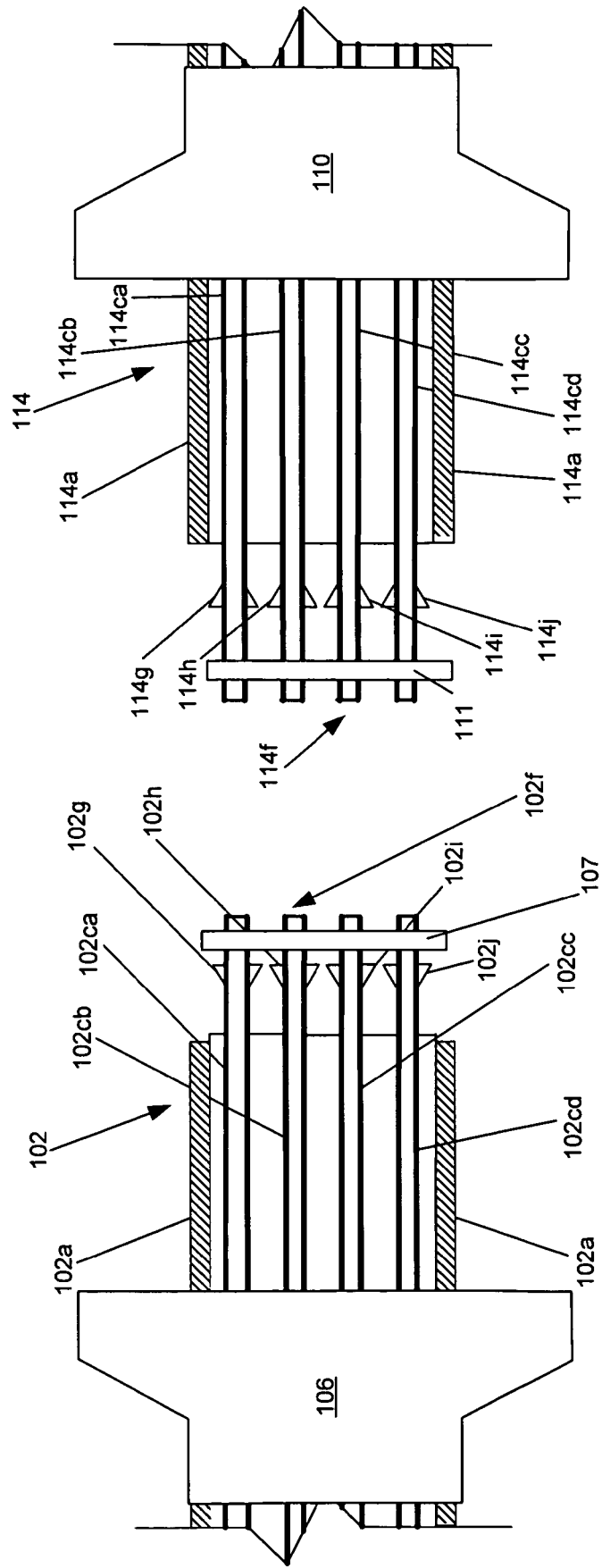
FIG. 15 is a side cross-sectional view of two umbilicals, each with an armor pot, retaining sleeves, and a potting dam.

Referring to FIG. 15, armor pot 106 is then placed over umbilical 102, and armor pot 110 is then placed over umbilical 114. Retaining sleeve 102g is then attached to conduit 102ca, retaining sleeve 102h is then attached to conduit 102cb, retaining sleeve 102i is then attached to conduit 102cc, and retaining sleeve 102j is then attached to conduit 102cd, all in a conventional manner. In addition, retaining sleeve 114g is then attached to conduit 114ca, retaining sleeve 114h is then attached to conduit 114cb, retaining sleeve 114i is then attached to conduit 114cc, and retaining sleeve 114j is then attached to conduit 114cd, also all in a conventional manner.

Potting dam 107 is then placed over exposed portions 102f, and potting dam 111 is then placed over exposed portions 114f.

Figure 16:
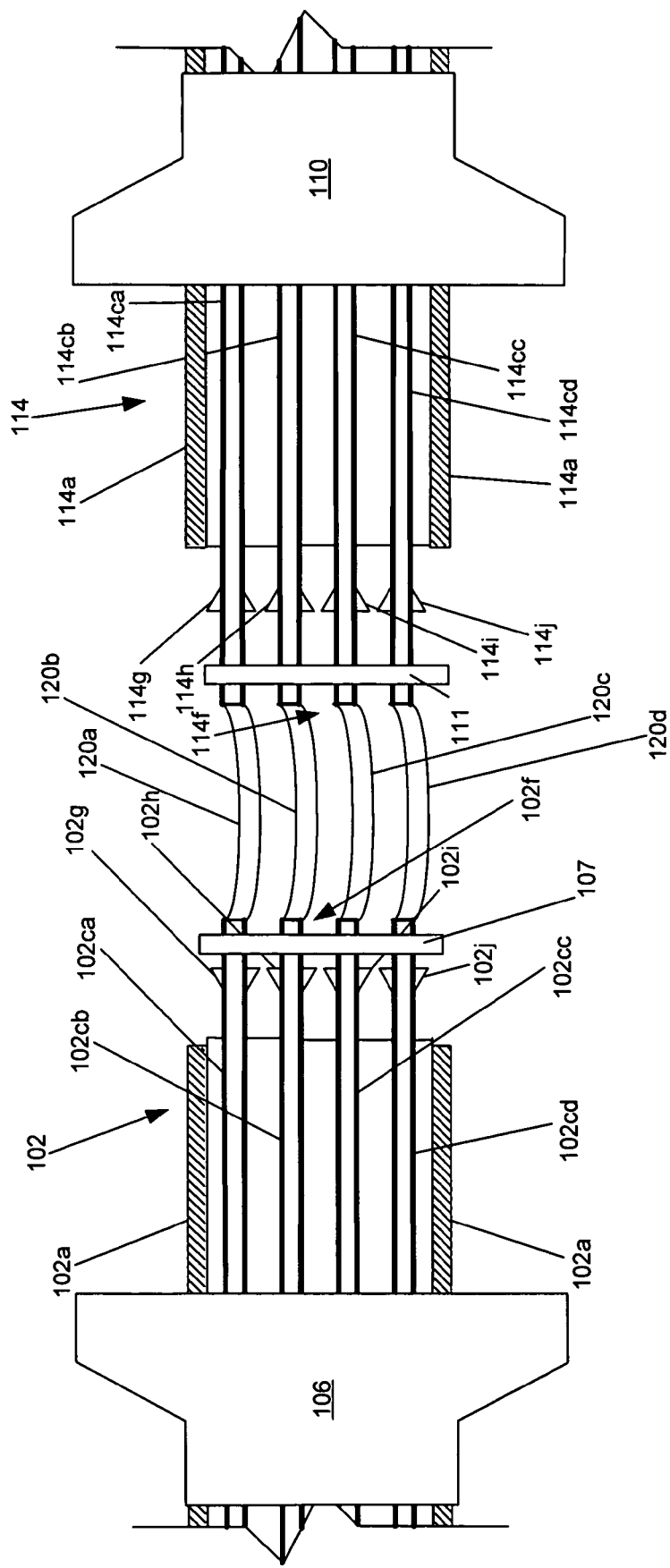
FIG. 16 is a side cross-sectional view of two umbilicals with connections made between their conduits.

Referring to FIG. 16, connection 120a is then connected to conduit 102ca and conduit 114ca, connection 120b is then connected to conduit 102cb and conduit 114cb, connection 120c is then connected to conduit 102cc and conduit 114cc, and connection 120d is then connected to conduit 102cd and conduit 114cd, all in a conventional manner. Connections 120a-120d may be for example, curved or straight. Connections 120a-120d may be adapted for use to conduits 102ca, 102cb, 102cc, 102cd, 114ca, 114cb, 114cc, and 114cd, for example, if conduits 102ca, 102cb, 114ca, and 114cb are pipes, connections 120a and 120b may be pipes. If conduits 102cc, 102cd, 114cc, and 114cd are electrical wires, connections 120c and 120d may be electrical wires.

Figure 17:
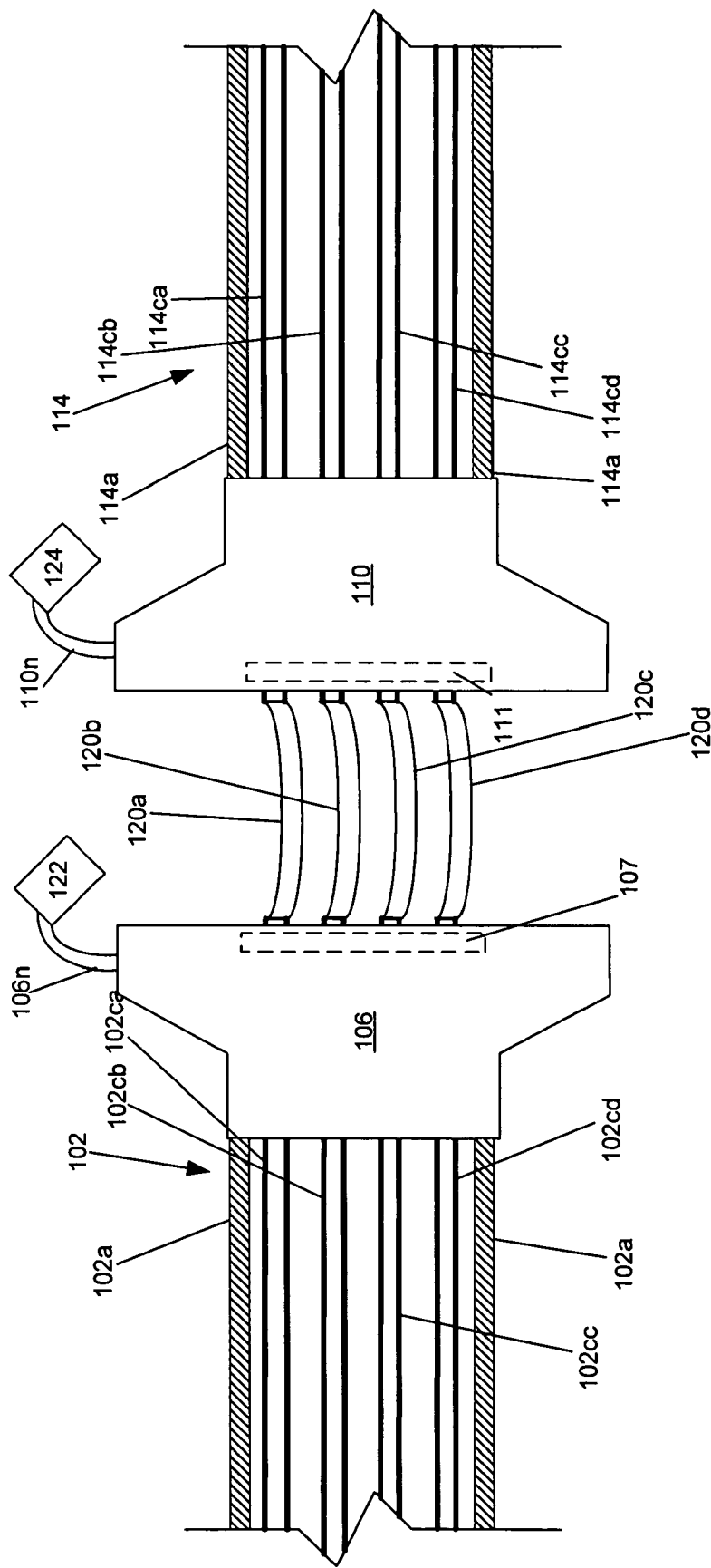
FIG. 17 is a side cross-sectional view of two umbilicals illustrating resin being poured into their armor pots.

Referring to FIG. 17, armor pot 106 is then moved adjacent to potting dam 107, and potting dam 107 is then attached to armor pot 106 in a conventional manner, and armor pot 110 is then moved adjacent to potting dam 111, and potting dam 111 is then attached to armor pot 110 in a conventional manner.

Resin 106n is then poured into armor pot 106 from container 122 to seal exposed portions 102l in a conventional manner, and to provide a strong connection to umbilical 102 by anchoring retaining sleeve 102g, retaining sleeve 102h, retaining sleeve 102i, and retaining sleeve 102j within resin 106n. Also, resin 110n is then poured into armor pot 110 from container 122 to seal exposed portions 114f in a conventional manner, and to provide a strong connection to umbilical 114 by anchoring retaining sleeve 114g, retaining sleeve 114h, retaining sleeve 114i, and retaining sleeve 114j within resin 110n. Potting dam 107 helps to contain resin 106n within armor pot 106, and potting dam 111 helps to contain resin 110n within armor pot 110.

Figure 18:
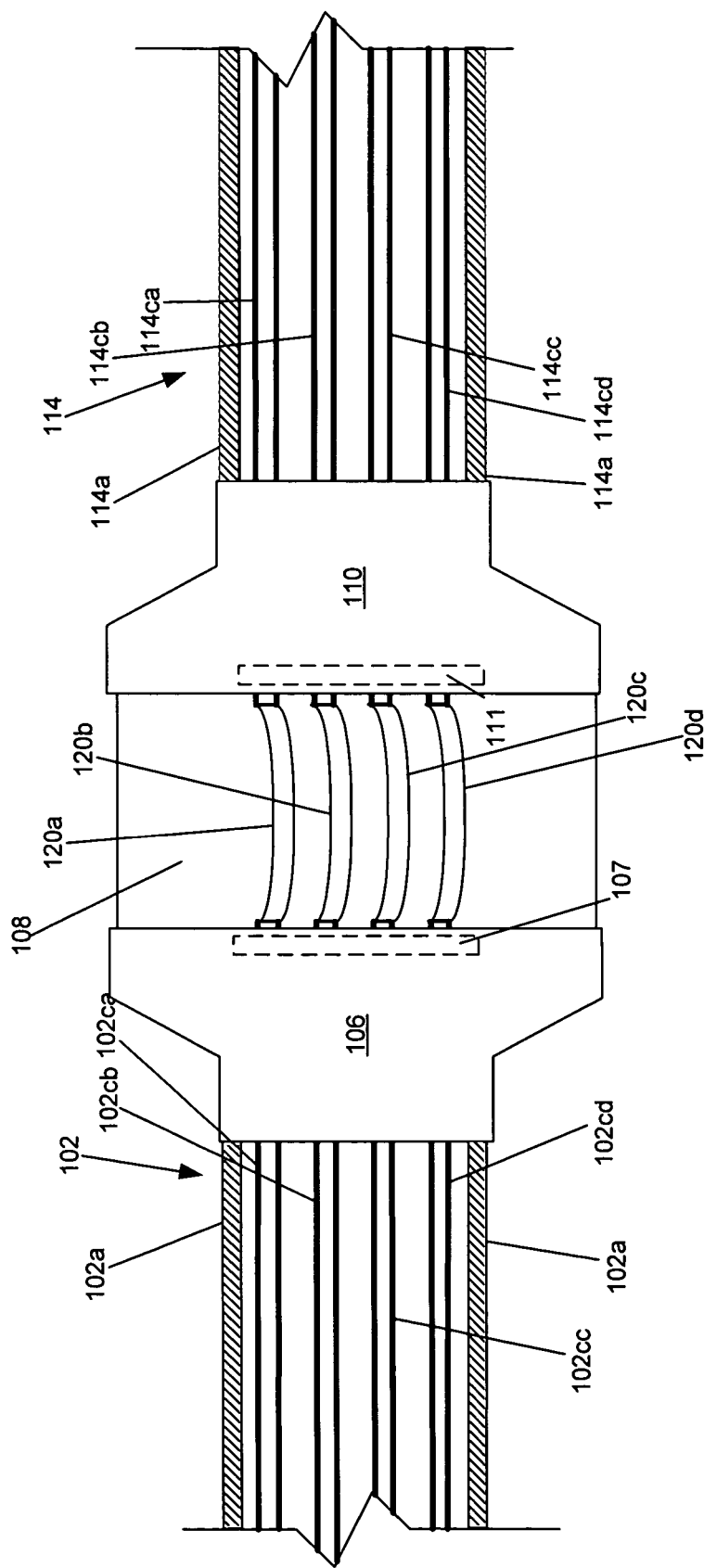
FIG. 18 is a side cross-sectional view of two umbilicals, armor pots, and a compliant splice installed between the armor pots.

Referring to FIG. 18, compliant splice 108 is then attached to armor pot 106 and armor pot 110, in a conventional manner.

Figure 19:
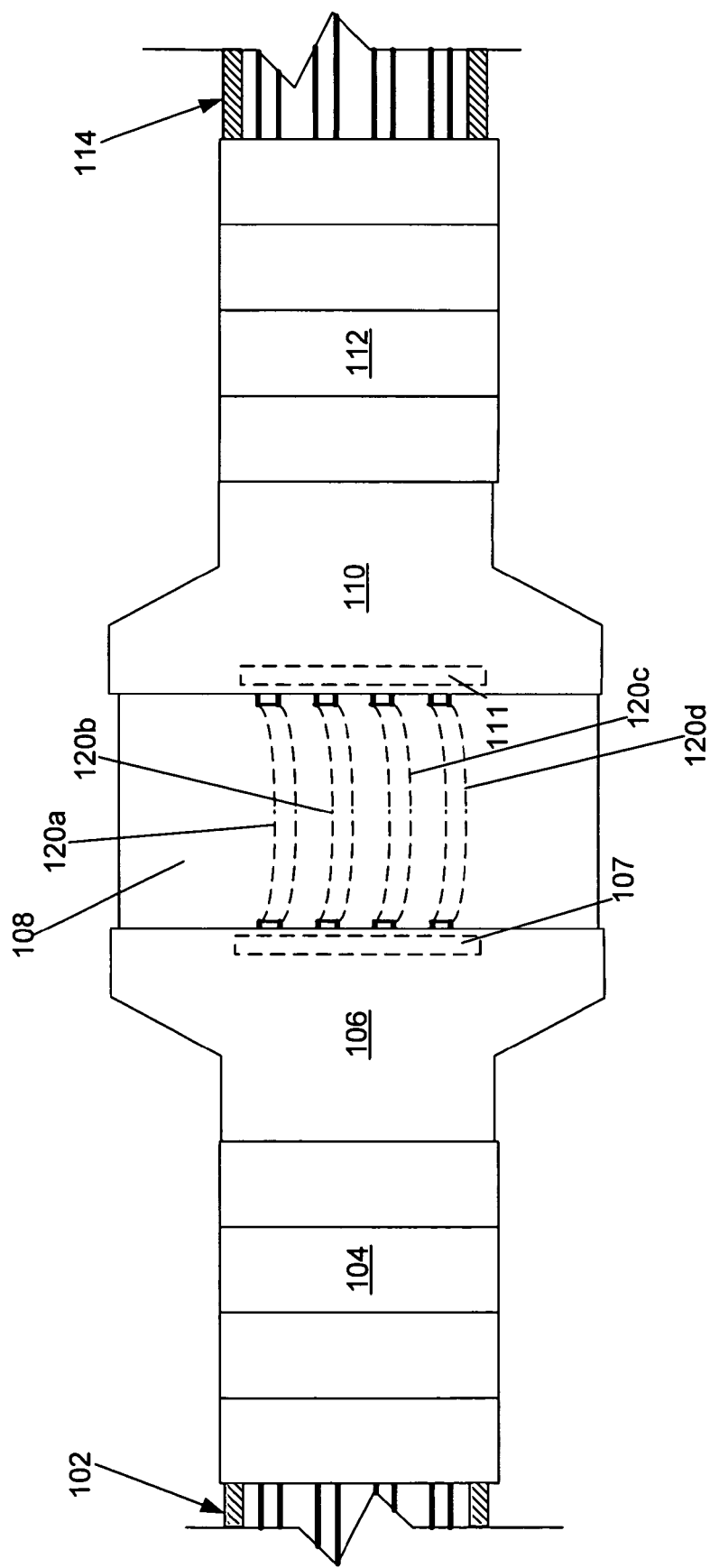
FIG. 19 is a side cross-sectional view of two umbilicals, armor pots, a compliant splice installed between the armor pots, and bend restrictors installed about the umbilicals.

Referring to FIG. 19, bend restrictor assembly 104 is then attached to armor pot 106 with restrictor adapter 104a, by bolting or welding restrictor adapter 104a to armor pot 106, and bend restrictor assembly 112 is then attached to armor pot 110 with restrictor adapter 112a, by bolting or welding restrictor adapter 112a to armor pot 110, both in a conventional manner.

Figure 20:
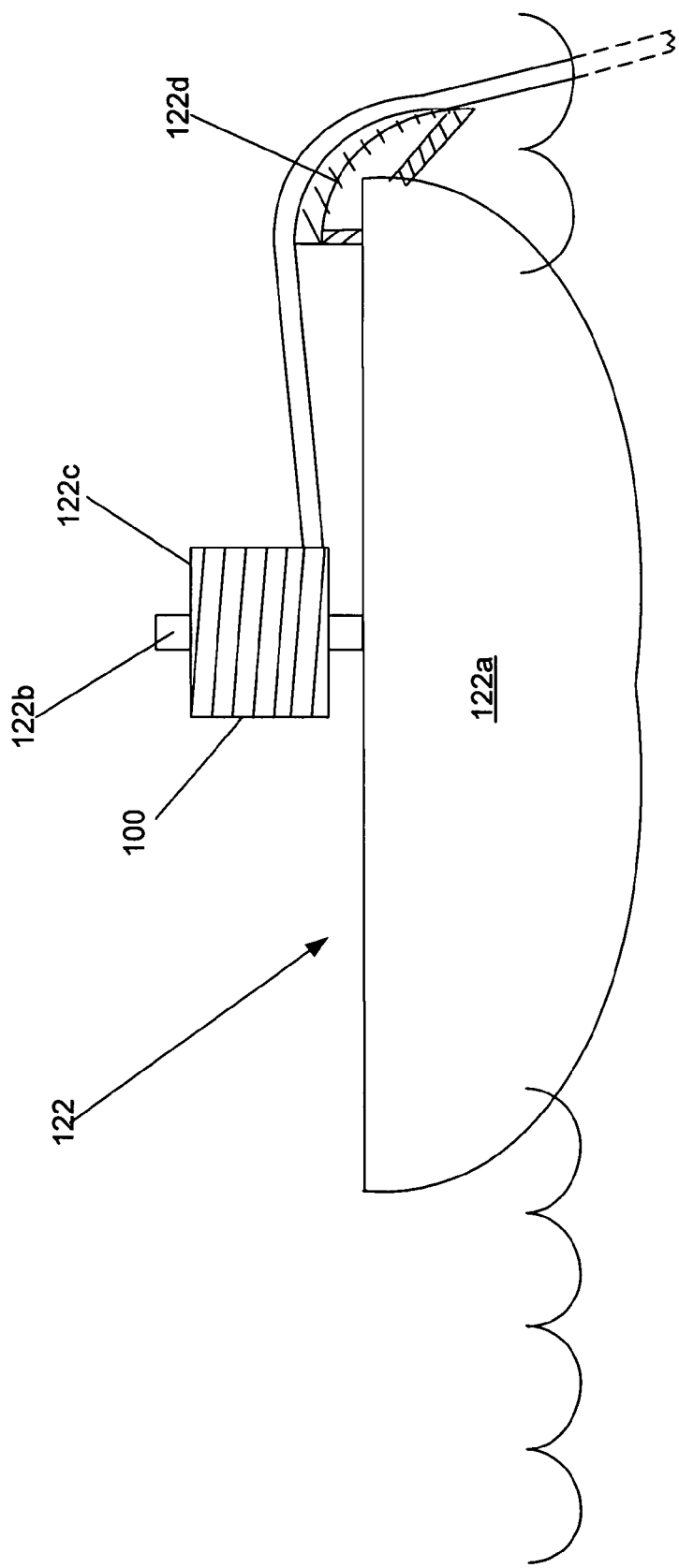
FIG. 20 illustrates a compliant splice system being lowered into the water from a ship.

Referring to FIG. 20, after system 100 has been assembled, system 100 may then be loaded onto delivery system 122. Delivery system 122 includes ship 122a, shaft 122b mounted to ship 122a, and a reel 122c rotationally mounted to shaft 122b. System 100 is loaded onto reel 122c.

To deliver system 100 to ocean floor 118, ship 122a is brought to a desired location, and first end of umbilical 114 is placed on chute 122d, and then lowered into the water. In one embodiment, an umbilical termination assembly (UTA) may be placed on the first end of umbilical 114 prior to being lowered into the water. Reel 122c rotates about shaft 122b to lower umbilical 114 into the water.

Figure 21:
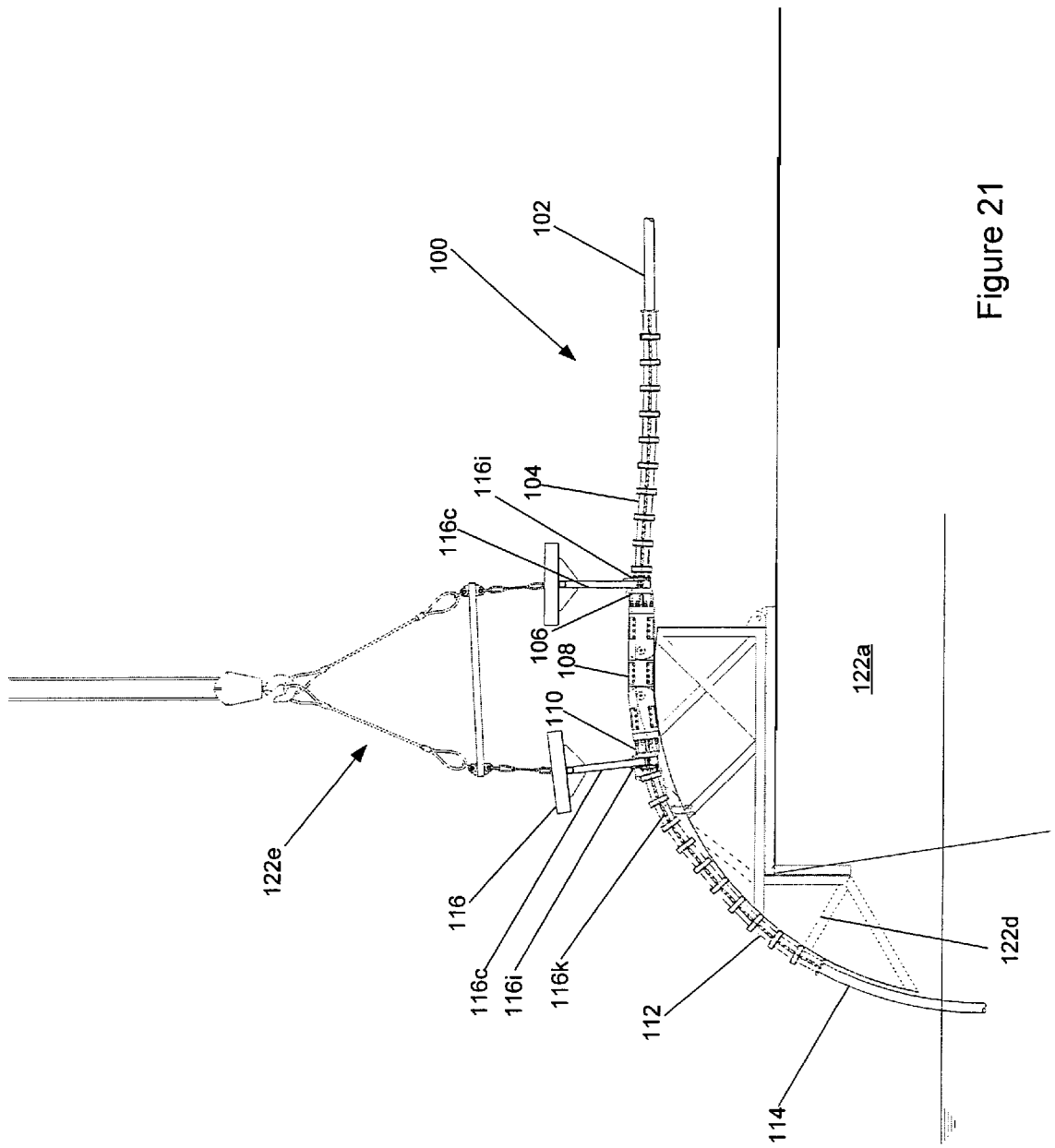
FIG. 21 illustrates a compliant splice system being lowered into the water over a chute.

Referring to FIG. 21, after compliant splice 108 is removed from reel 122c, the process stops. At this point, mud mat assembly 116 is attached to armor pot 106 and armor pot 110, using receiving mechanisms 116d. A first pin assembly 116i is inserted into hole 106g of armor pot 106, and a second pin assembly 116i is inserted into hole 110g of armor pot 110. Pin assemblies 116i within holes 106g and 110g prevent mud mat assembly 116 from rotating relative to armor pot 106 and armor pot 110.

Lifting mechanism 122e is attached to mud mat 116b and mud mat 116g, to rotate mud mat assembly 116 and compliant splice 108 to the proper orientation prior to being placed on chute 122d. Once compliant splice and mud mat assembly 116 are in the proper orientation and on chute 122d, lifting mechanism 122e is uncoupled from mud mat 116b and mud mat 116g, and reel 122c continues to rotate and lowers compliant splice 108 into the water.

After compliant splice 108 is in the water, but before compliant splice 108 is on ocean floor 118, pin assemblies 116i are removed by pulling tie wraps 116k at end of lanyards 116l and 116m, which allow mud mat assembly 116 to rotate relative to armor pot 106, armor pot 110, and compliant splice 108. Gravity acts on mud mat 116b and mud mat 116g to pull them downwards, so that mud mat 116b and mud mat 116g land on ocean floor 118, and compliant splice 108 is not on ocean floor 118, but resting on mud mat assembly 116.

Figure 22:
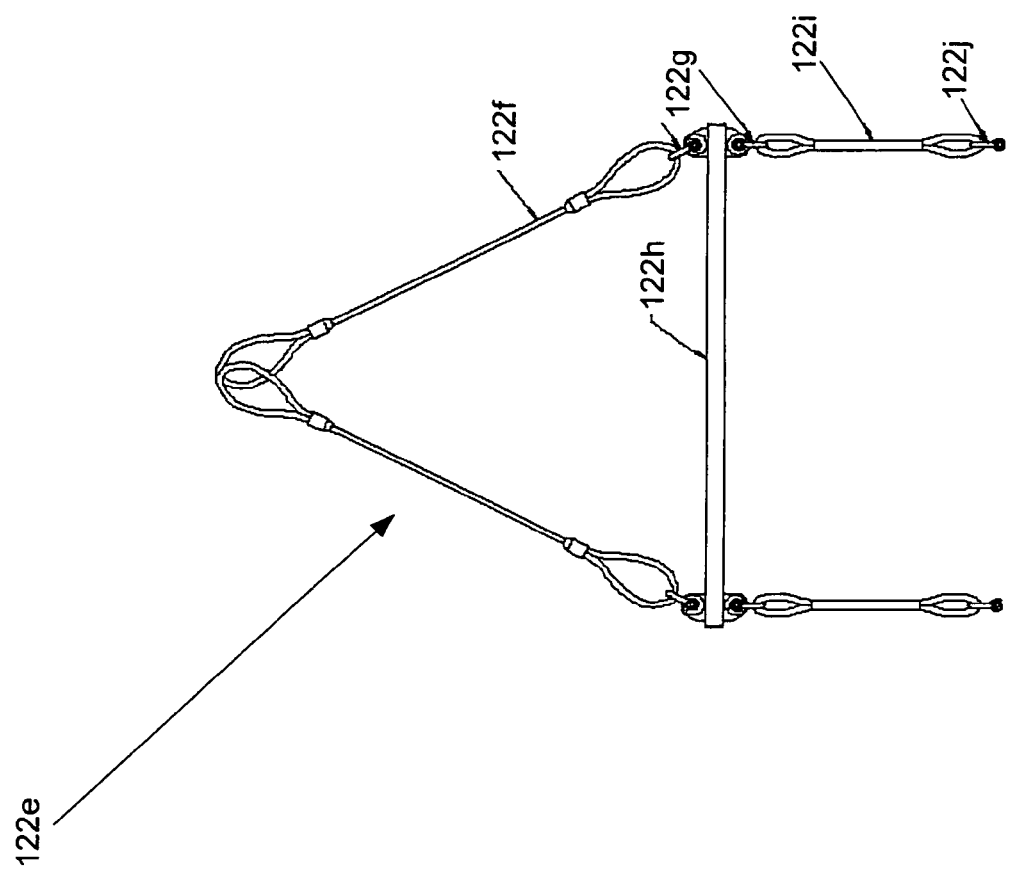
FIG. 22 illustrates a lifting assembly.

Referring to FIG. 22, Lifting mechanism 122e includes wire rope slings 122f, attached by anchor shackles 122g to spreader bar 122h. Another set of anchor shackles 122g attach round slings 122i to spreader bar 122h. Anchor shackles 122j are on the end of round slings 122i, configured to attach to another component, for example mud mat 116b and mud mat 116g.

Reel 122c continues to rotate to lower umbilical 102 into the water. At the end of umbilical 102 may be located a second UTA or a bull nose, as are known in the art.

Figure 2:
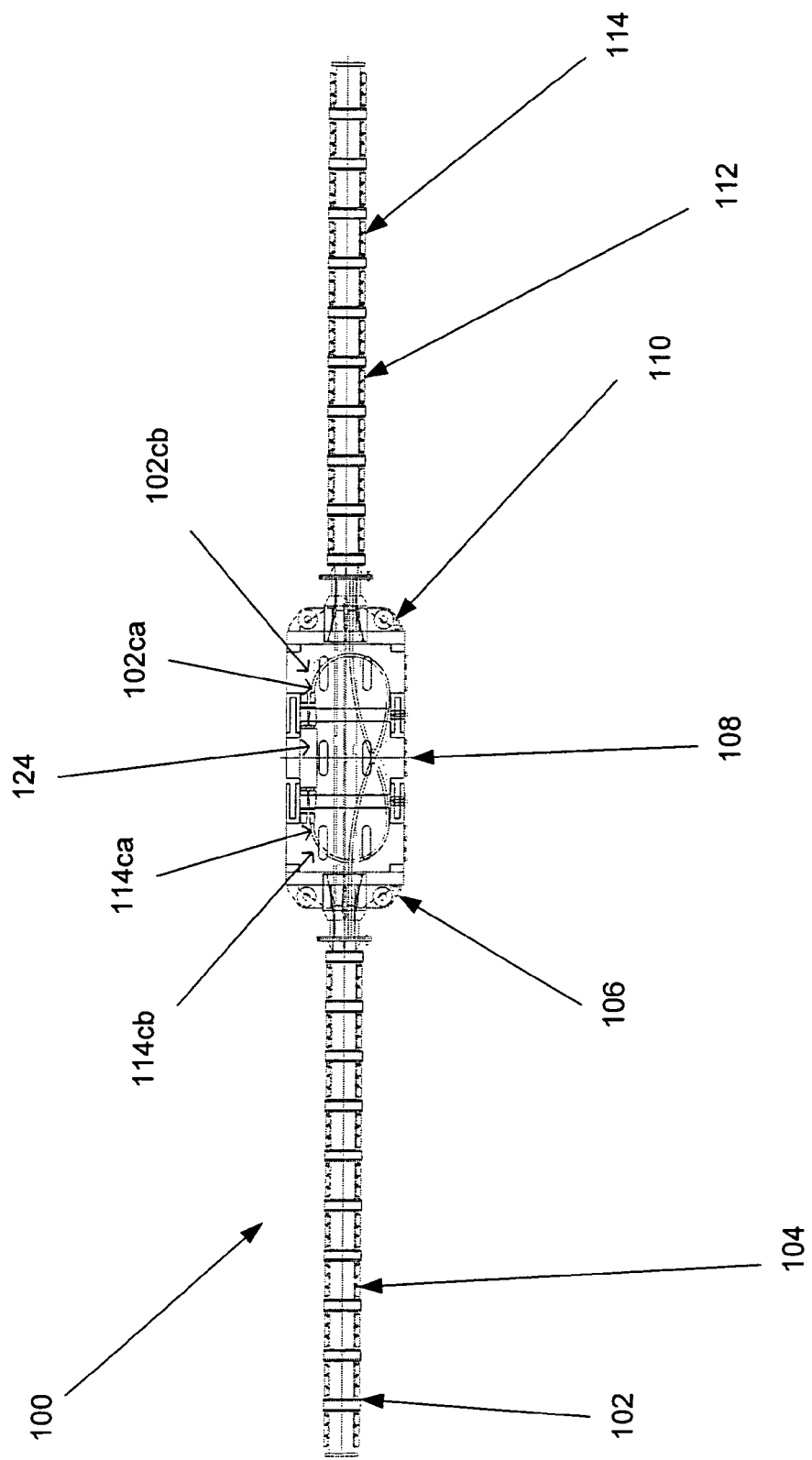
FIG. 2 is a top view illustrating a compliant splice system.
Figure 3A:
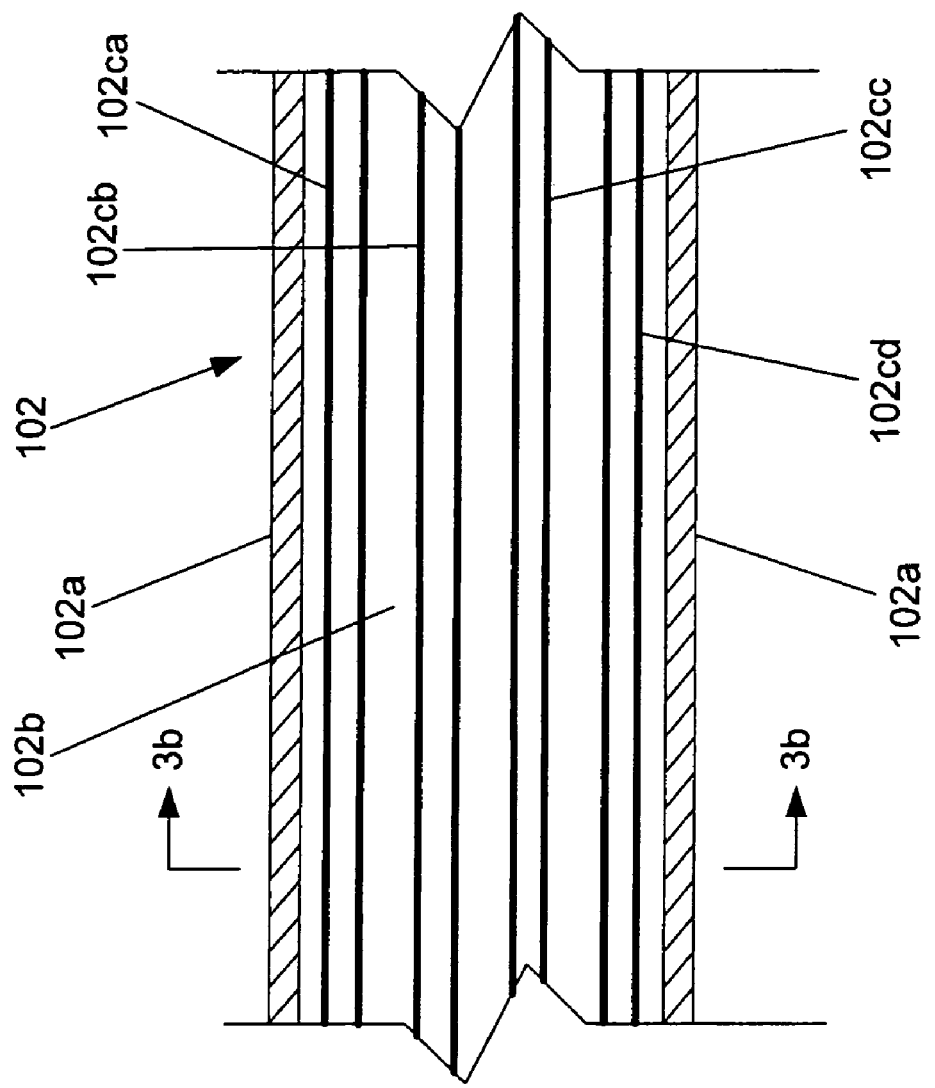
FIG. 3a is a side cross-sectional view of an umbilical.
Figure 3B:
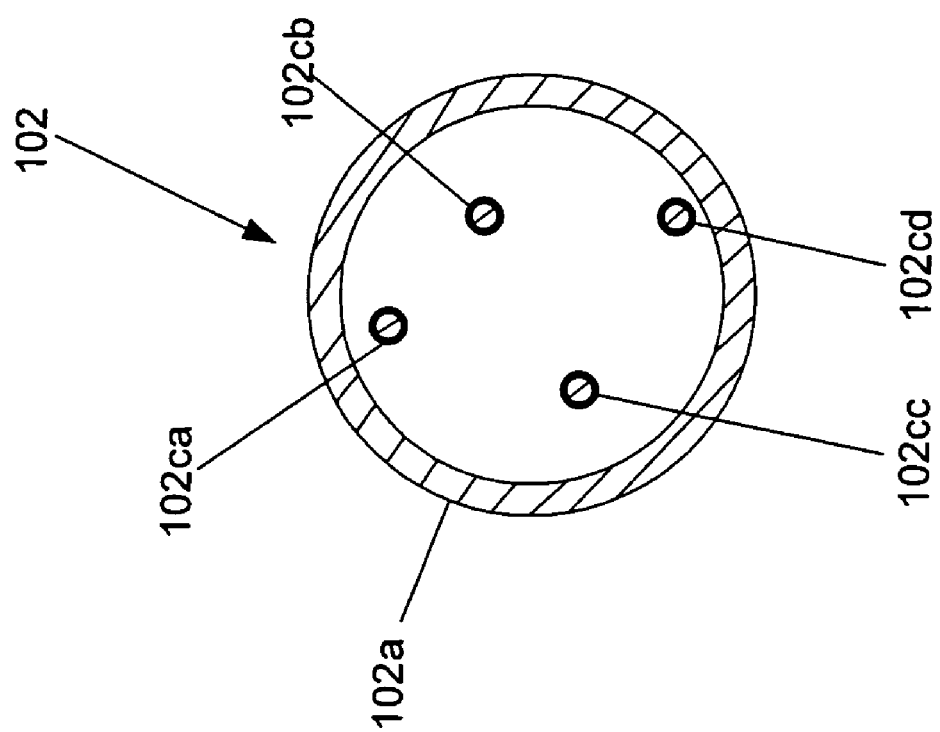
FIG. 3b is an end cross-sectional view of an umbilical.
Figure 4A:
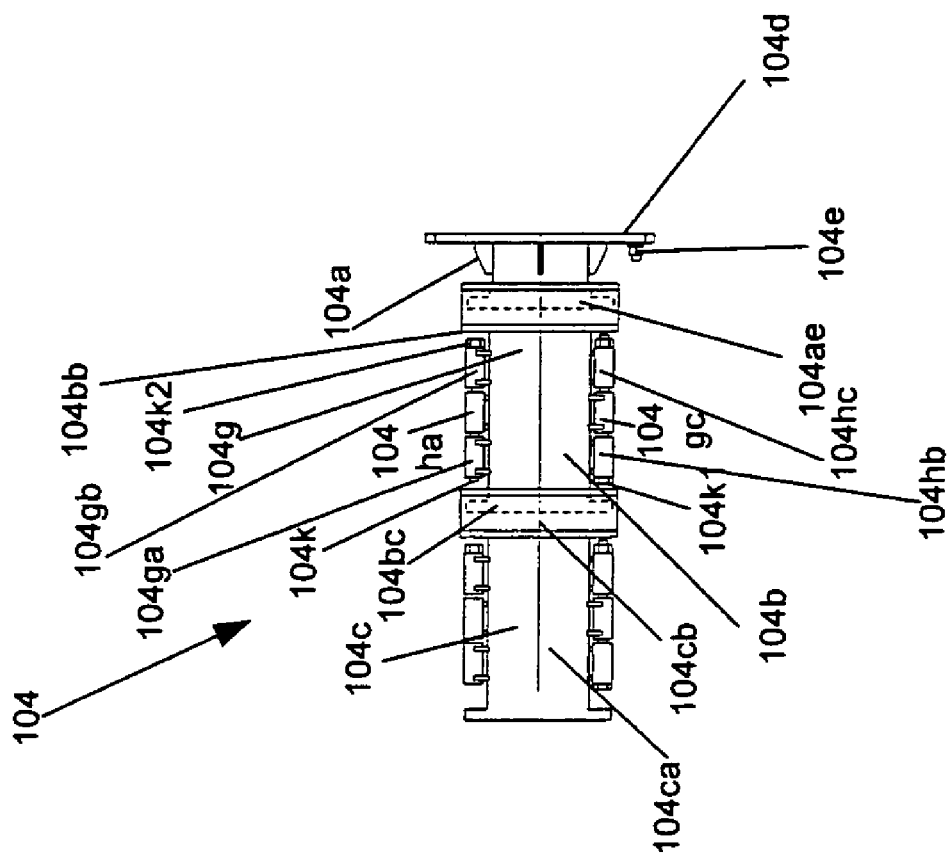
FIG. 4a is a side view of a bend restricter assembly.
Figures 4E, 4F, 4G:
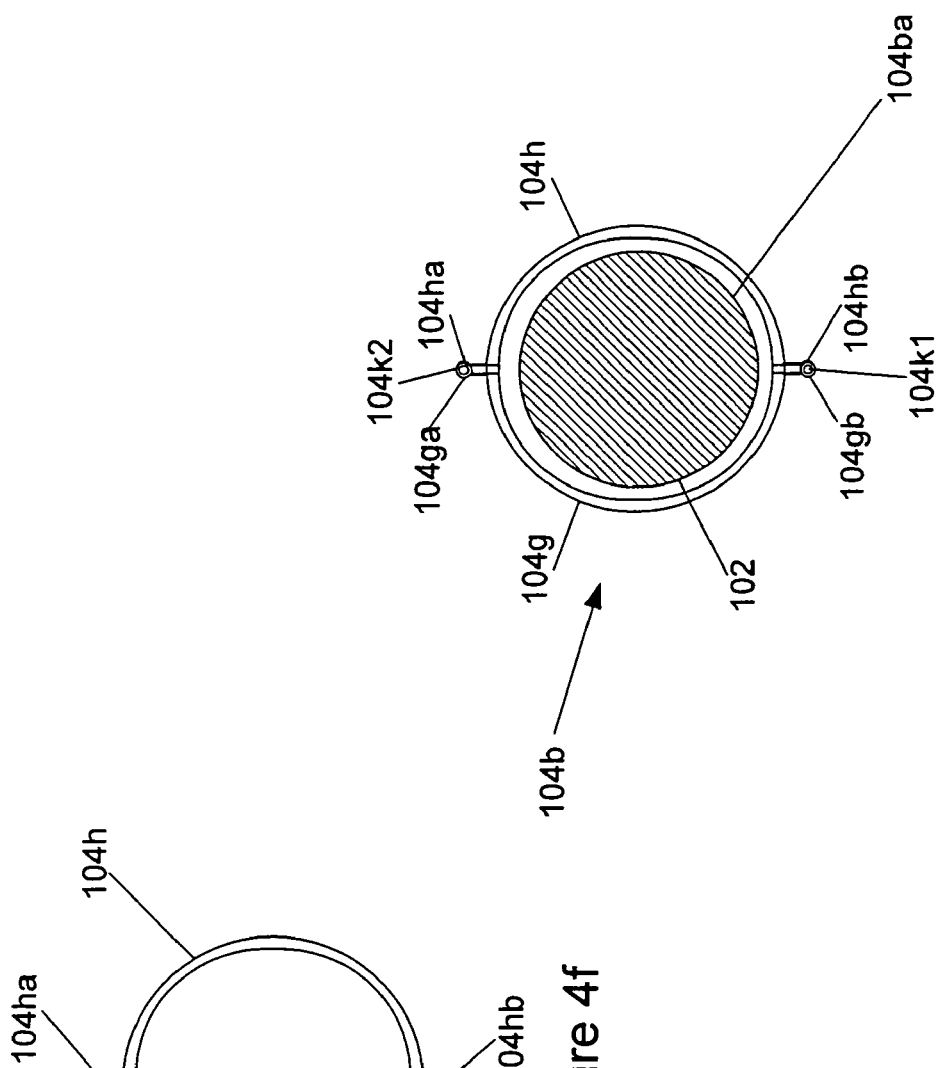
FIG. 4e is an end view of a bend restricter arcuate segment.
FIG. 4f is an end view of a bend restricter arcuate segment.
FIG. 4g is an end view of two bend restricter arcuate segments assembled.
Figure 4H:
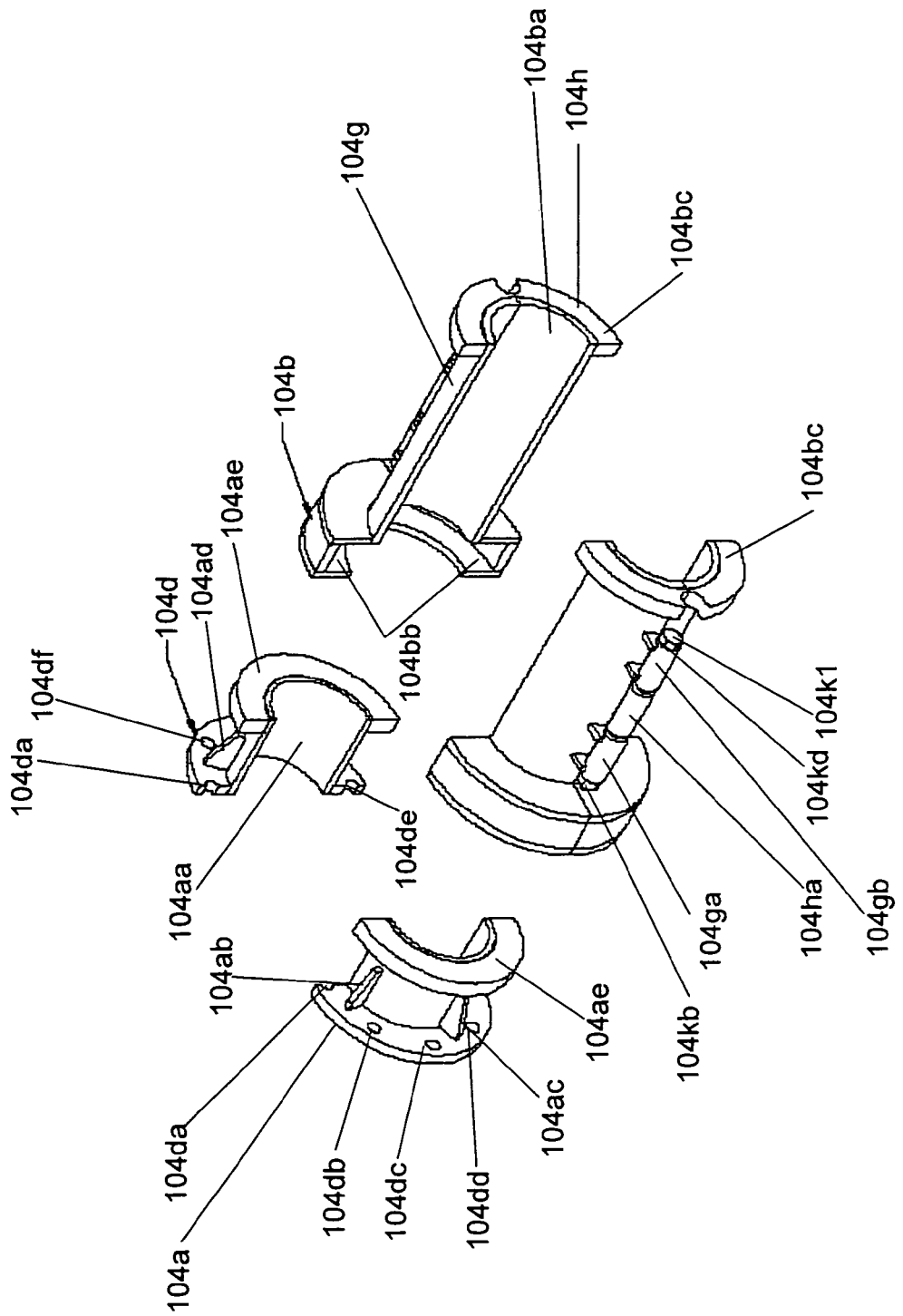
FIG. 4h is an exploded view of a bend restricter assembly.
Figure 4I:
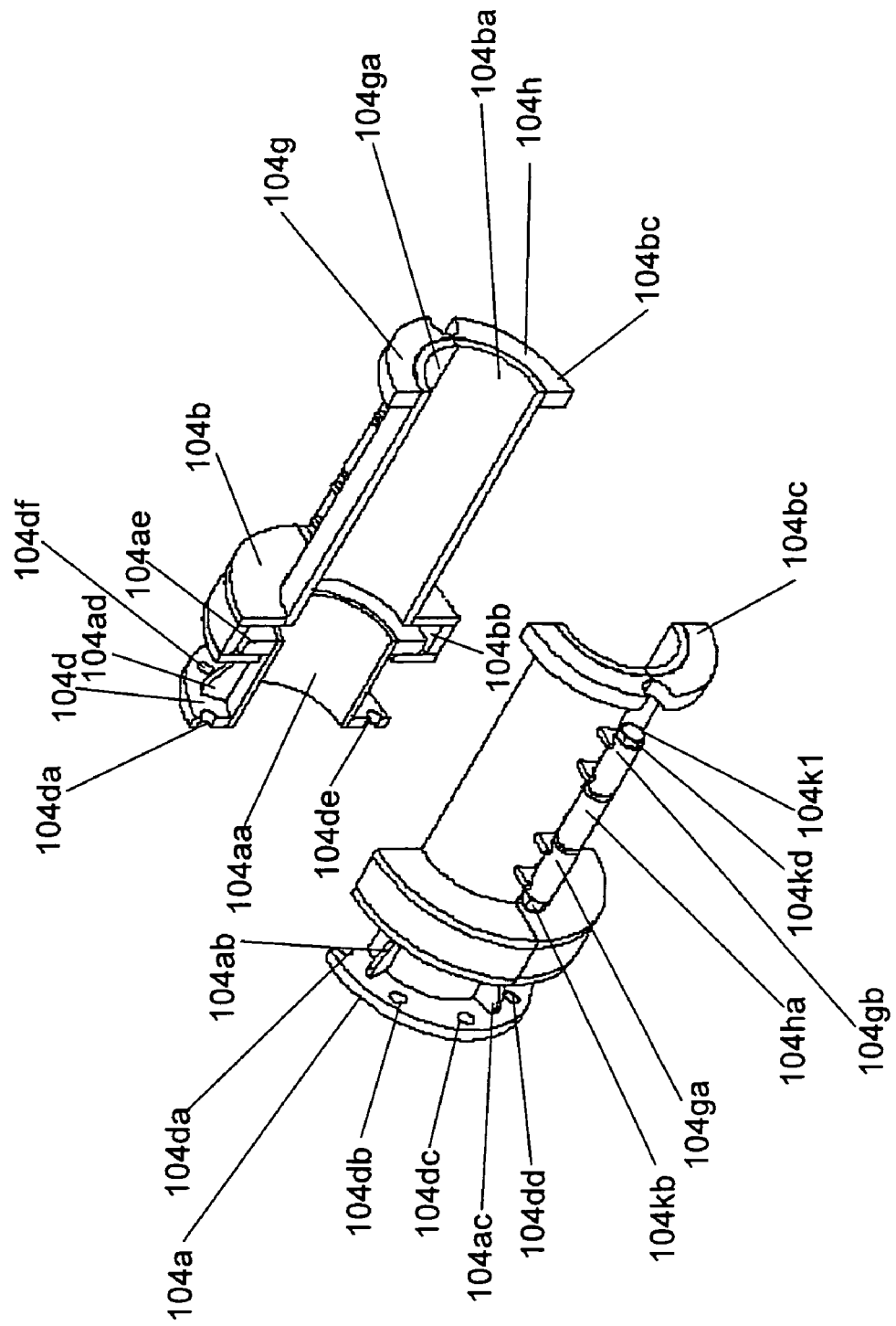
FIG. 4i is an exploded view of a bend restricter assembly.
Figure 4J:
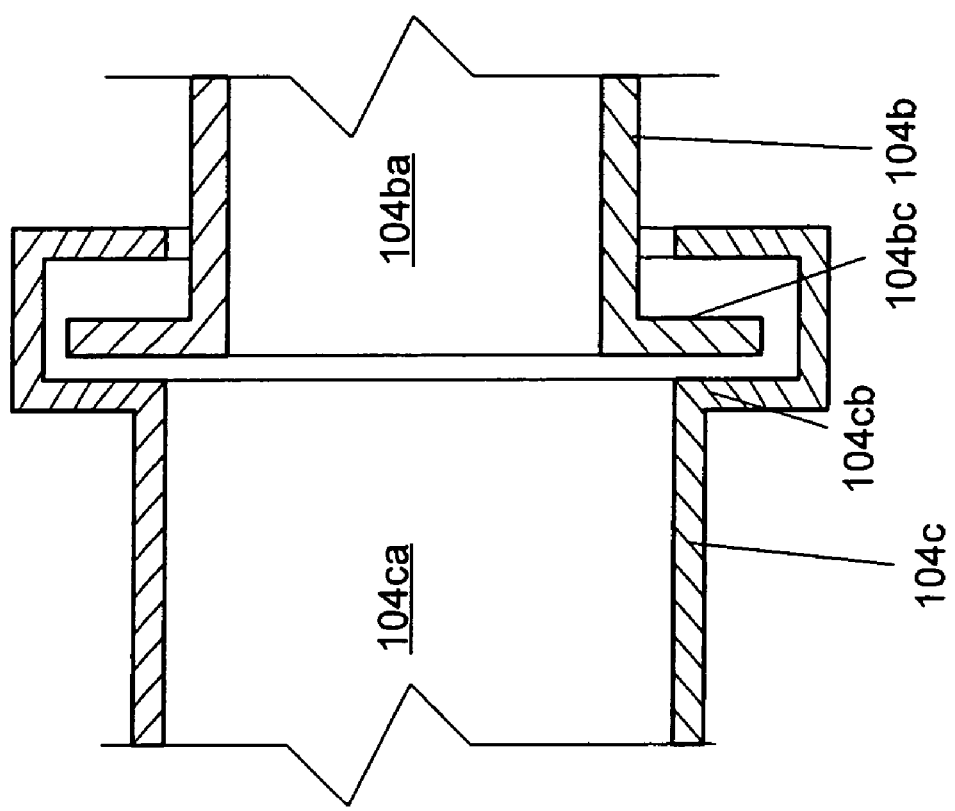
FIG. 4j is a side cross-sectional view of the interface between two bend restricter segments.
Figure 5A:
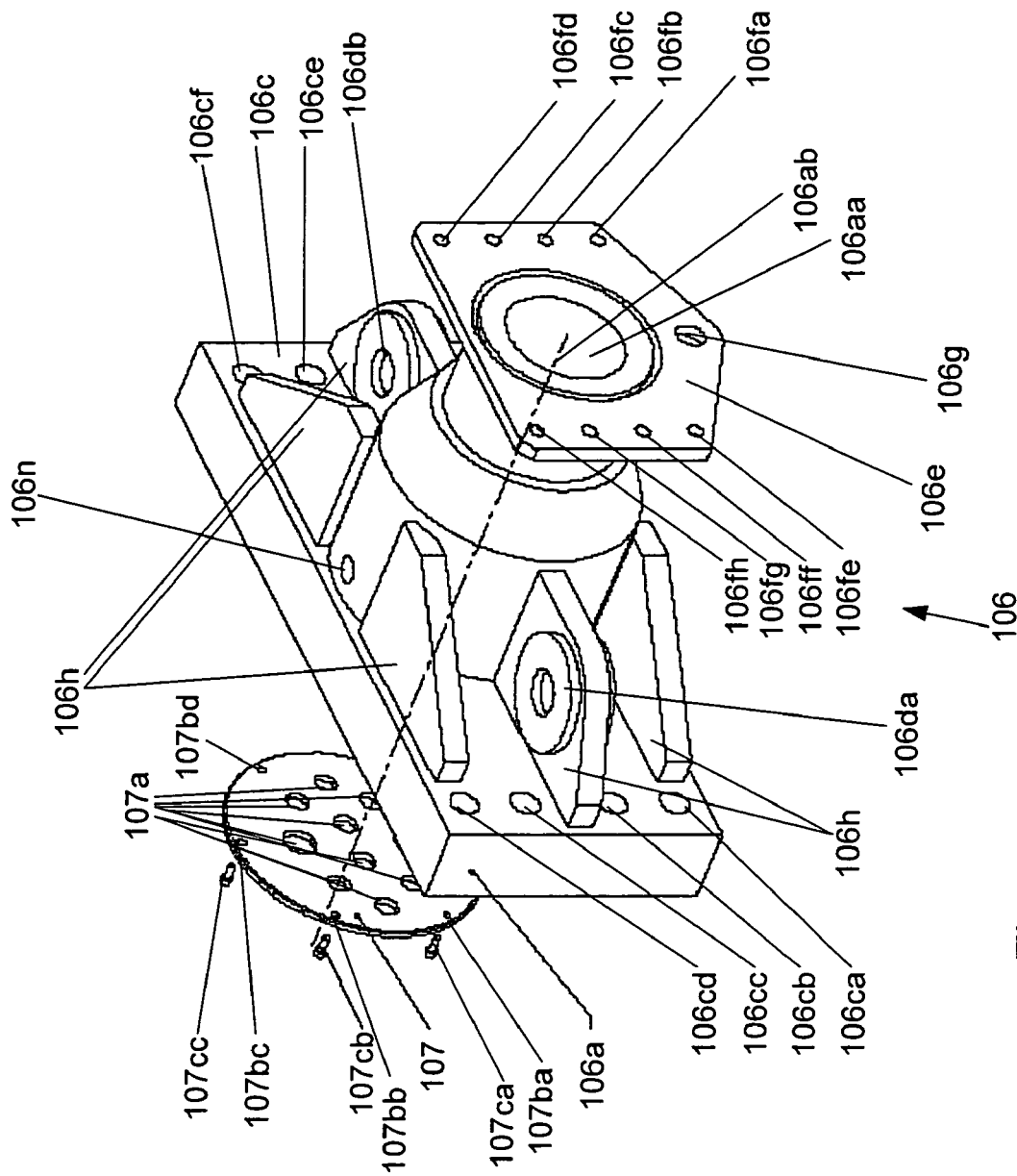
FIG. 5a is a perspective view of an armor pot.
Figure 5B:
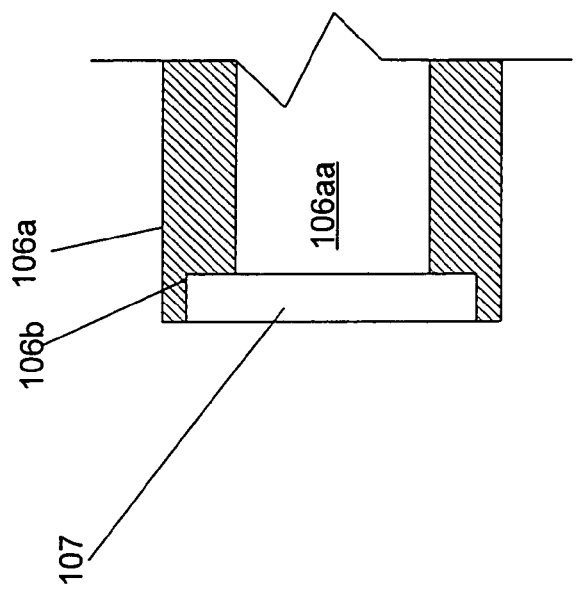
FIG. 5b is a side cross-sectional view of an armor pot.
Figure 6:
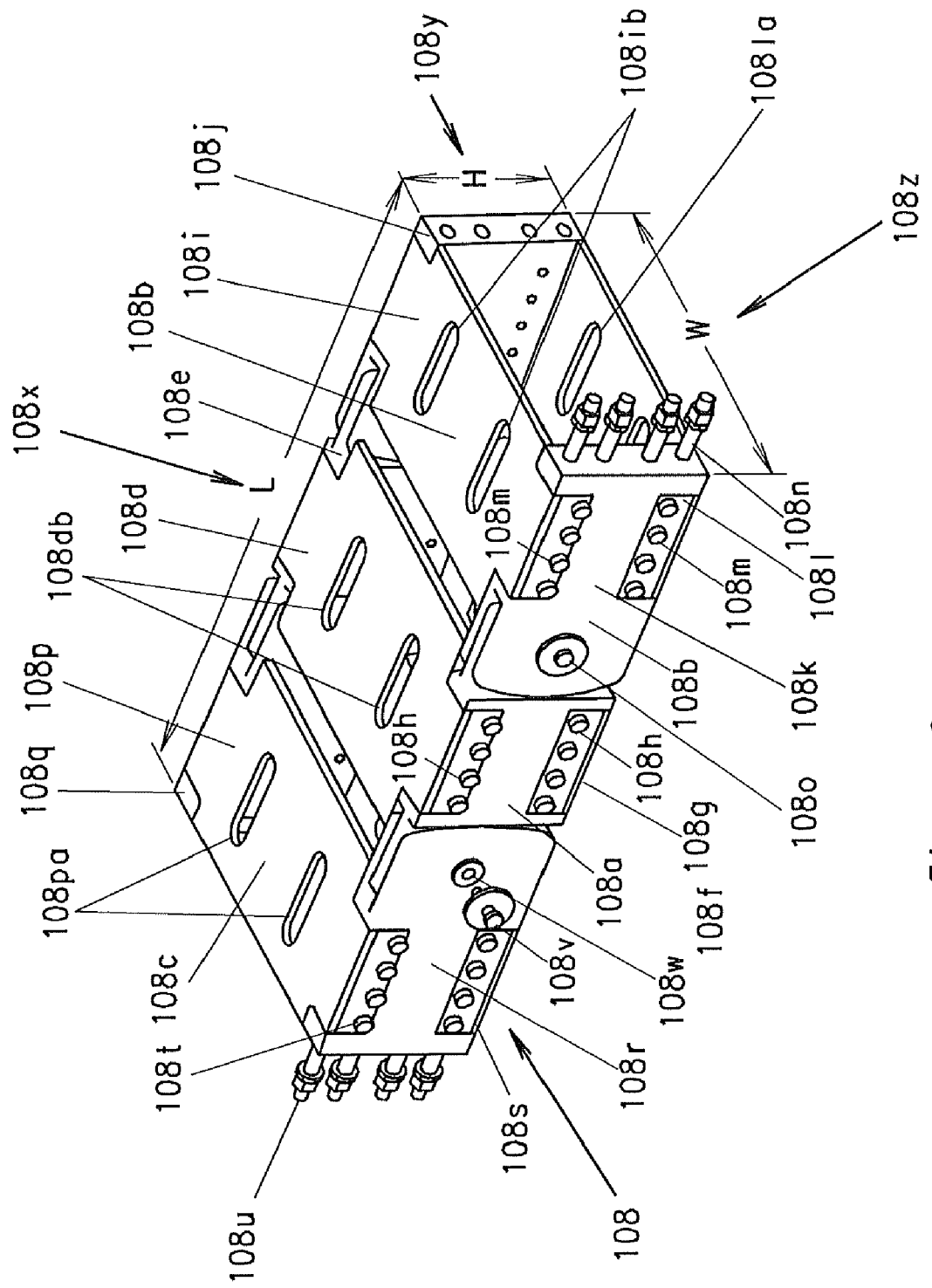
FIG. 6 is a perspective view of a compliant splice.
Figure 7:
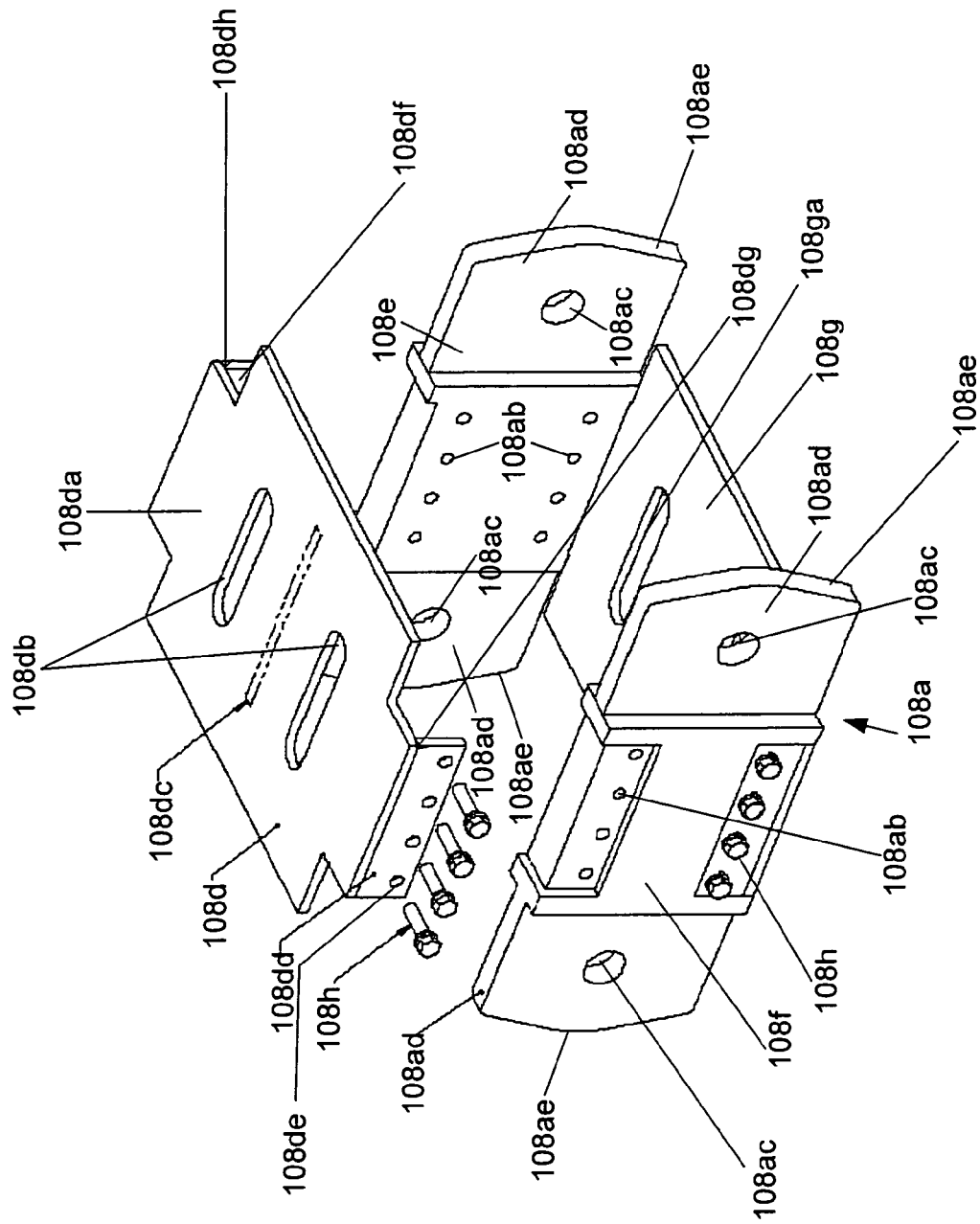
FIG. 7 is a perspective partially exploded view of a midjoint of a compliant splice.
Figure 8:
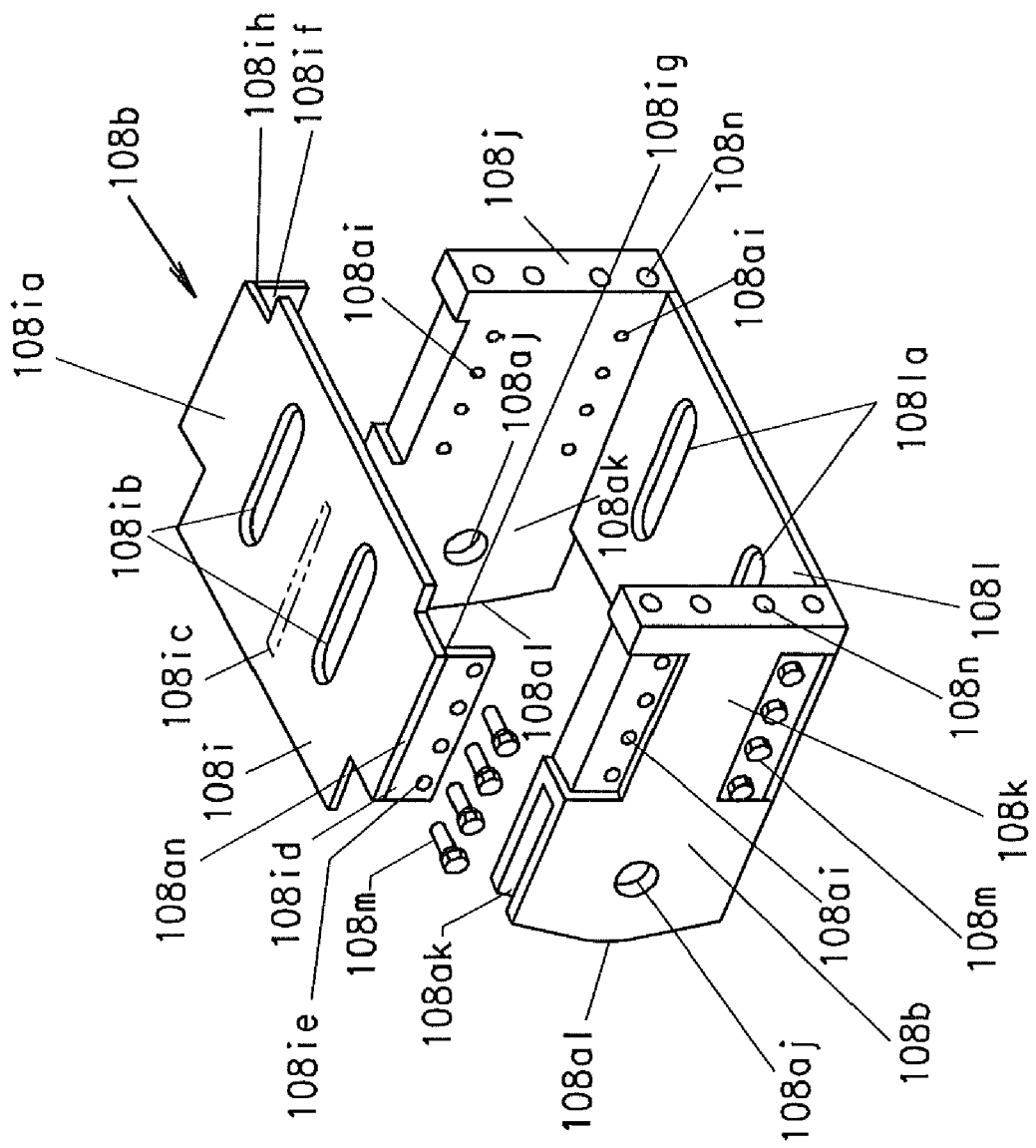
FIG. 8 is a perspective partially exploded view of an end joint of a compliant splice.
Figure 9A:
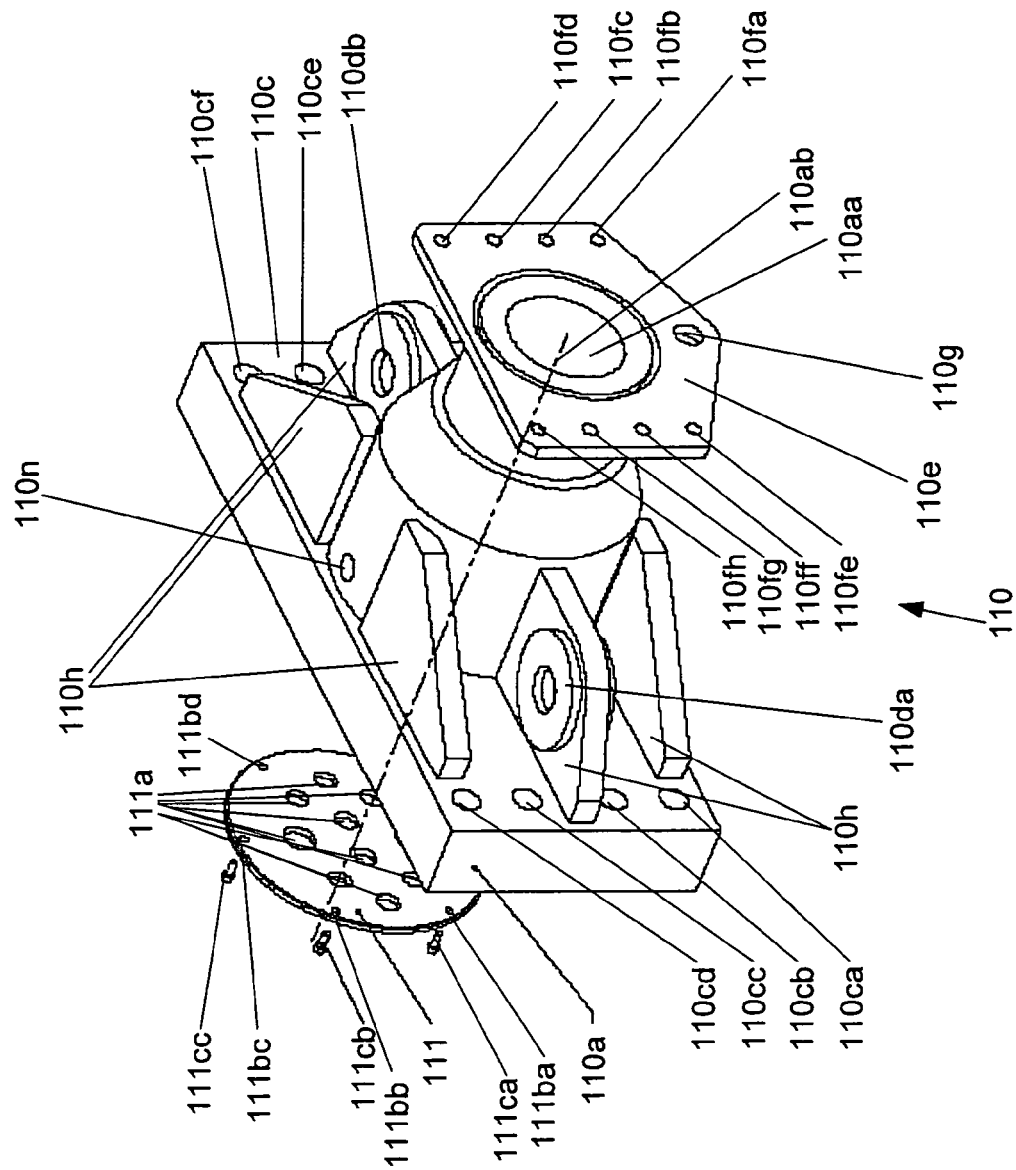
FIG. 9a is a perspective view of an armor pot.
Figure 9B:
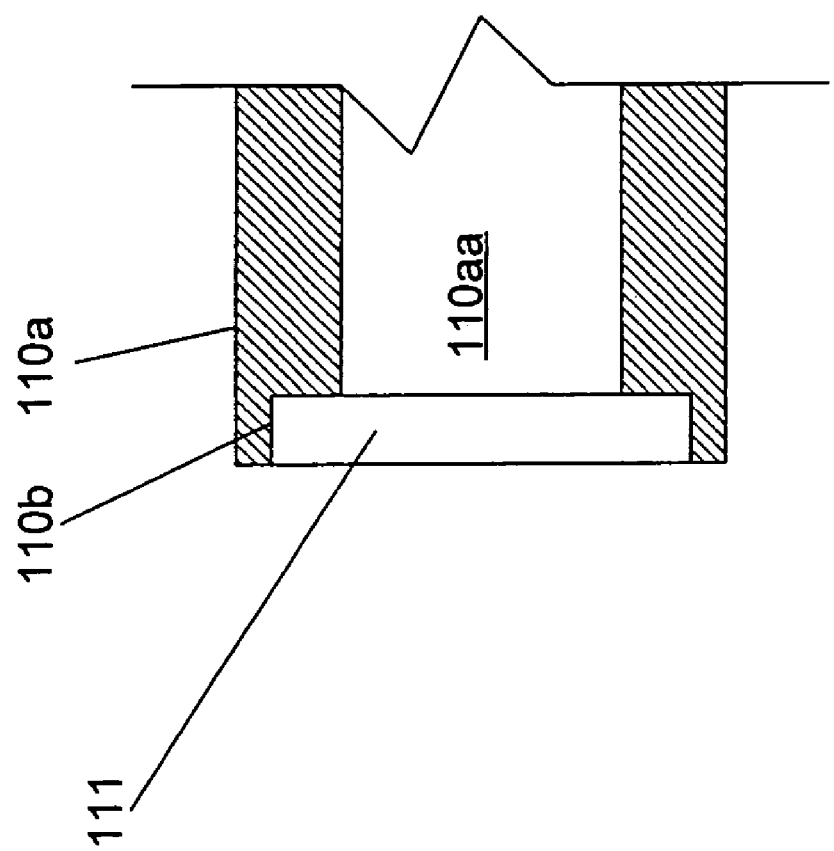
FIG. 9b is a side cross-sectional view of an armor pot.
Figure 10A:
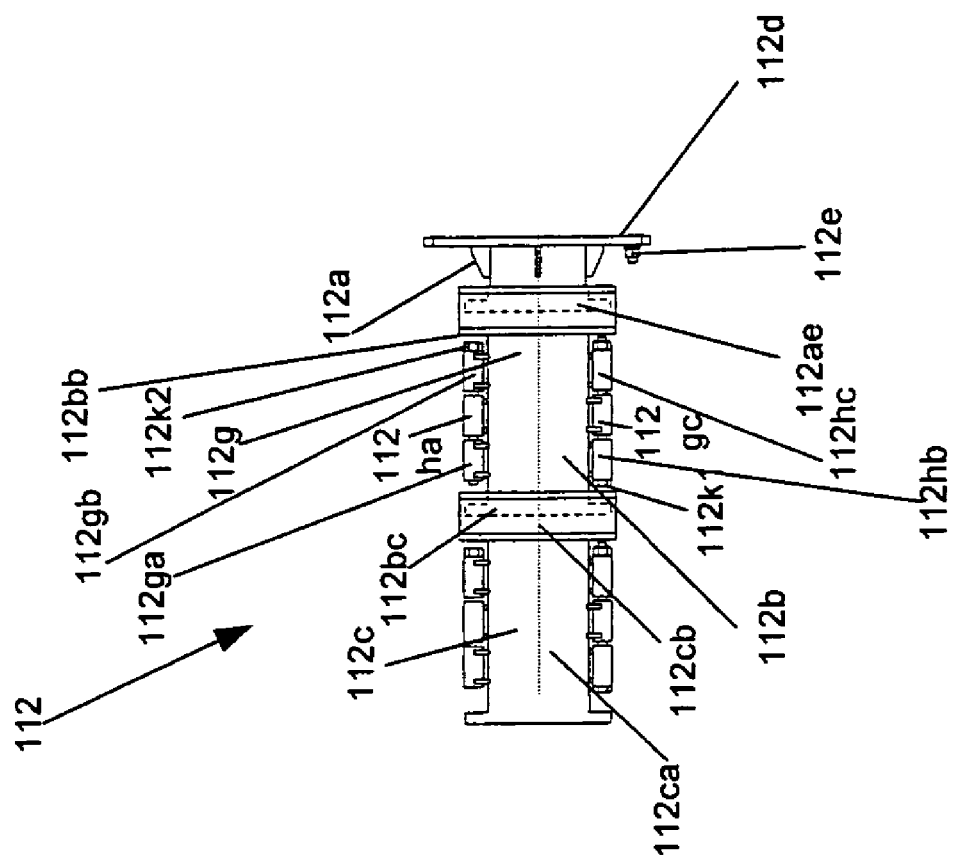
FIG. 10a is a side view of a bend restricter assembly.
Figures 10E, 10F, 10G:
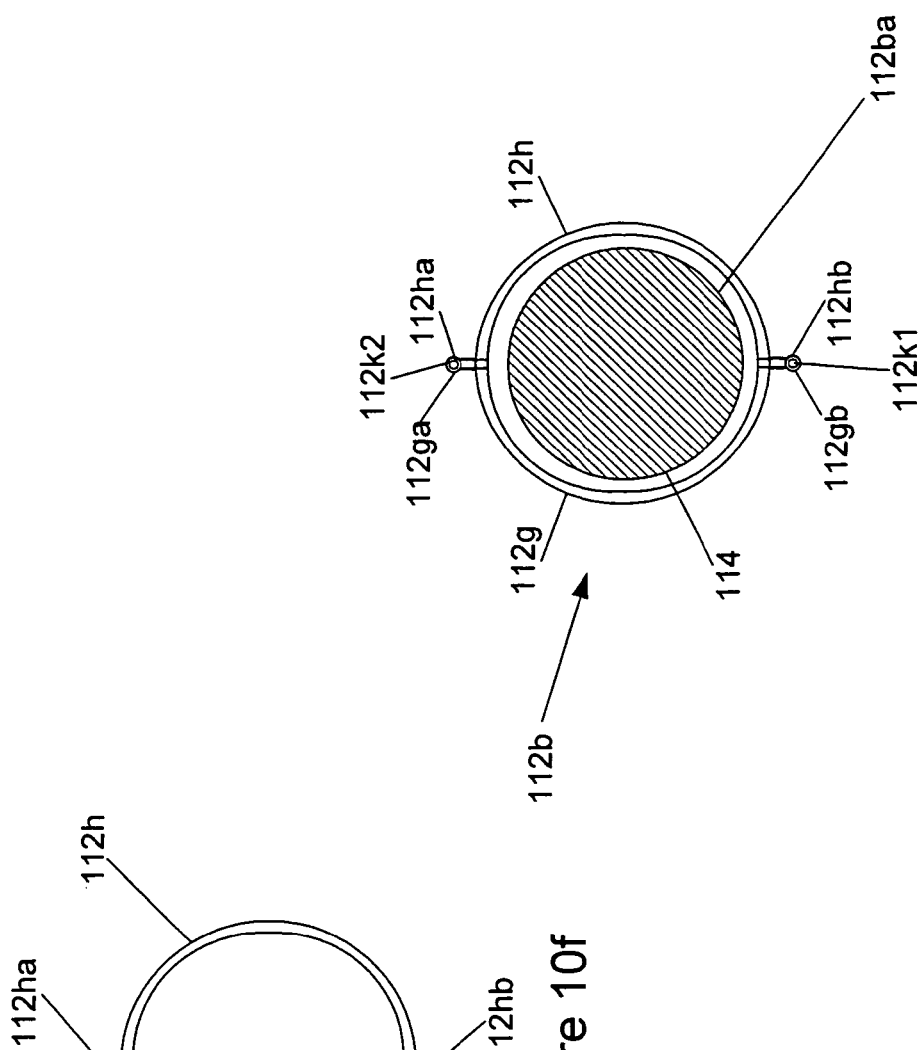
FIG. 10e is an end view of a bend restricter arcuate segment.
FIG. 10f is an end view of a bend restricter arcuate segment.
FIG. 10g is an end view of two bend restricter arcuate segments assembled.
Figure 10H:
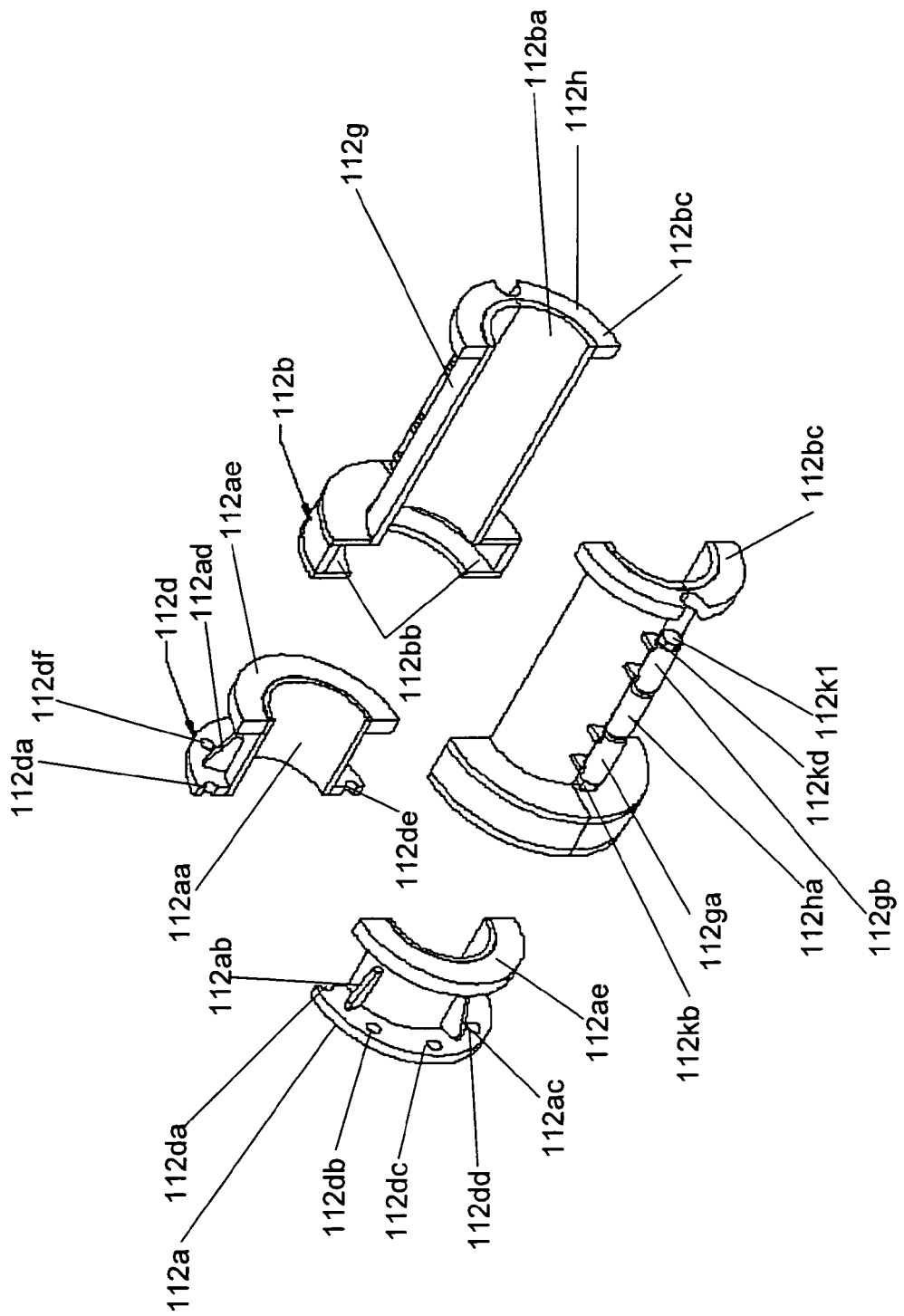
FIG. 10h is an exploded view of a bend restricter assembly.
Figure 10I:
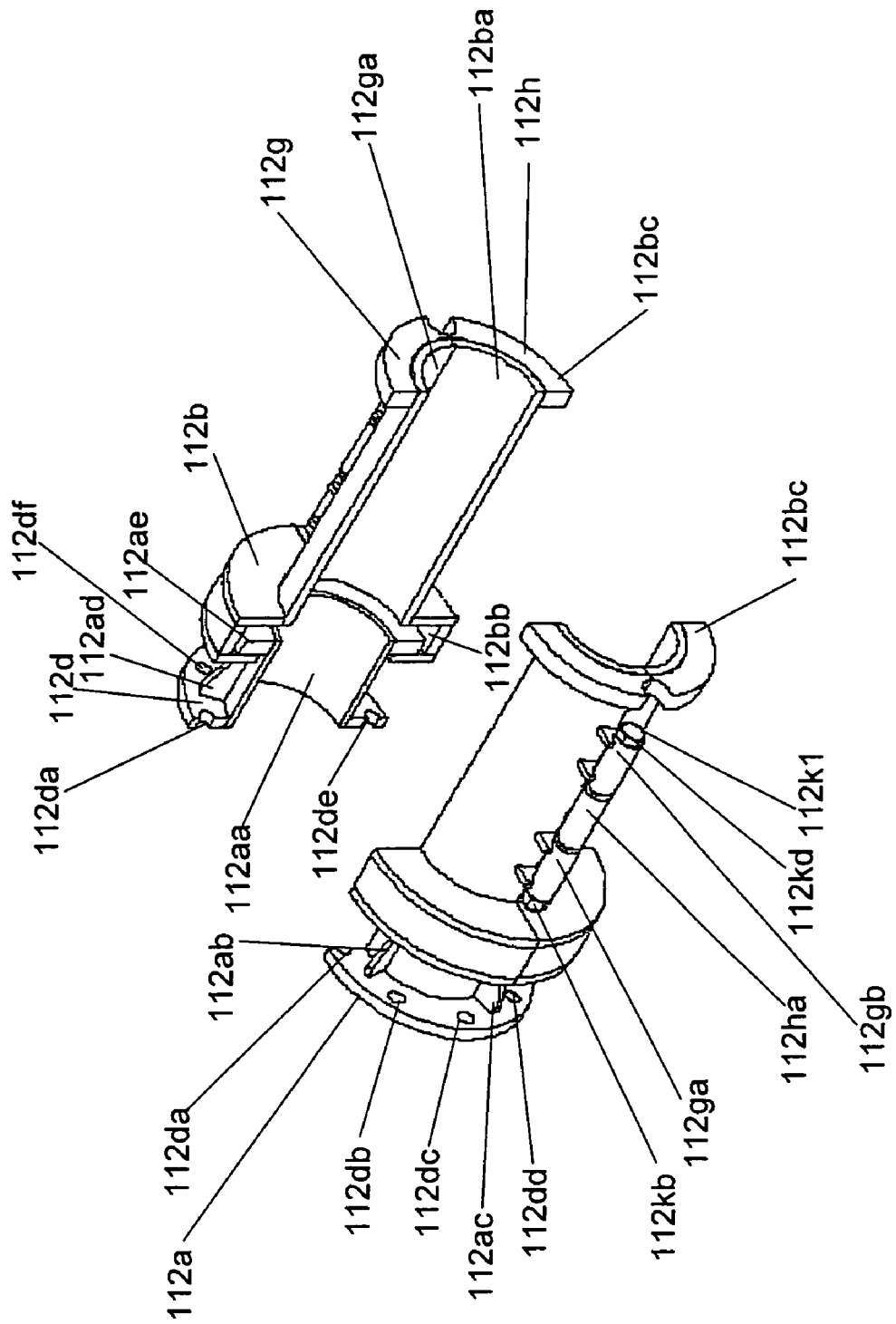
FIG. 10i is an exploded view of a bend restricter assembly.
Figure 10J:
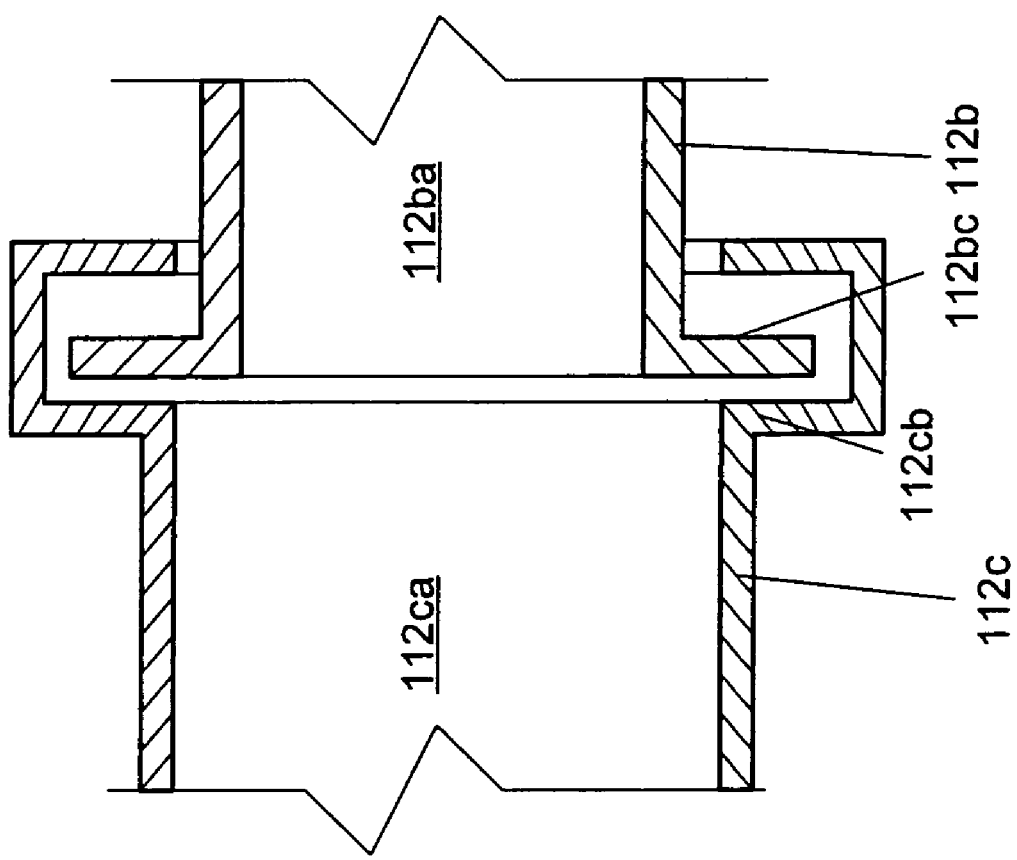
FIG. 10j is a side cross-sectional view of the interface between two bend restricter segments.
Figure 11A:
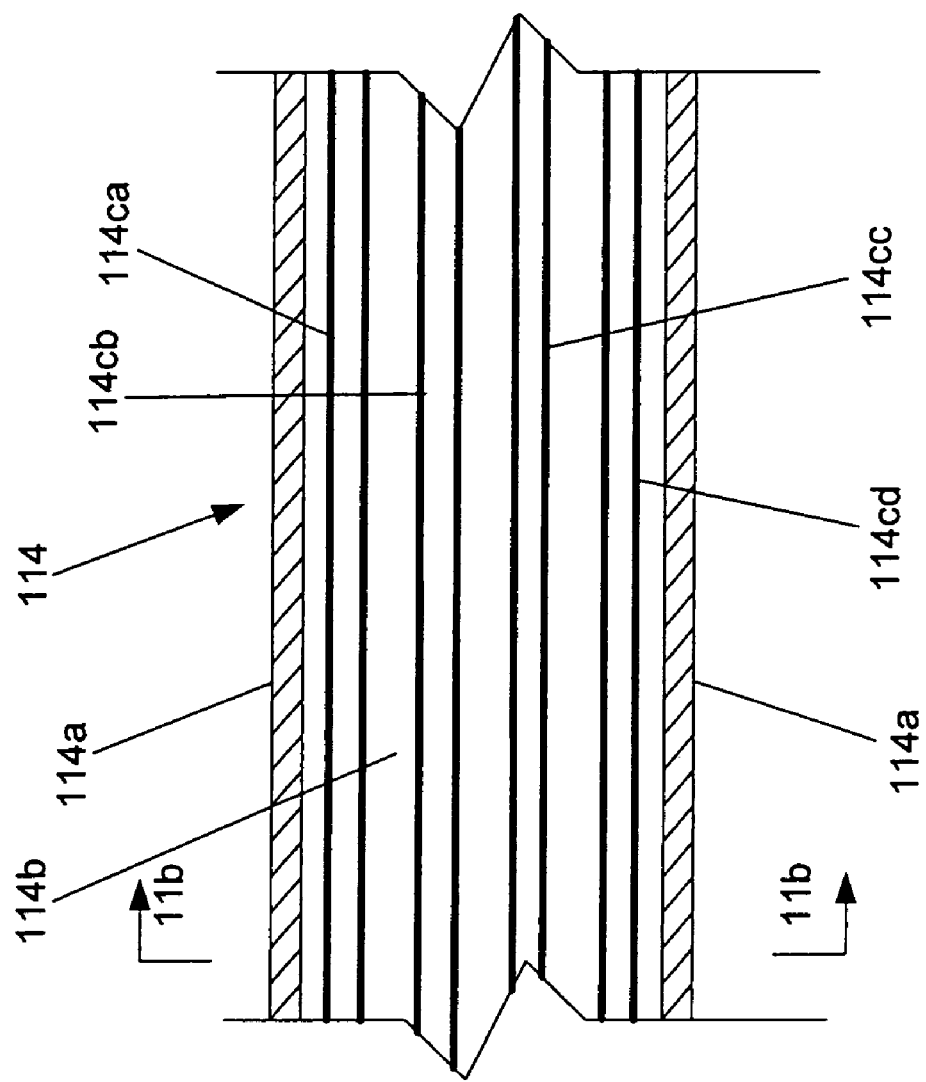
FIG. 11a is a side cross-sectional view of an umbilical.
Figure 11B:
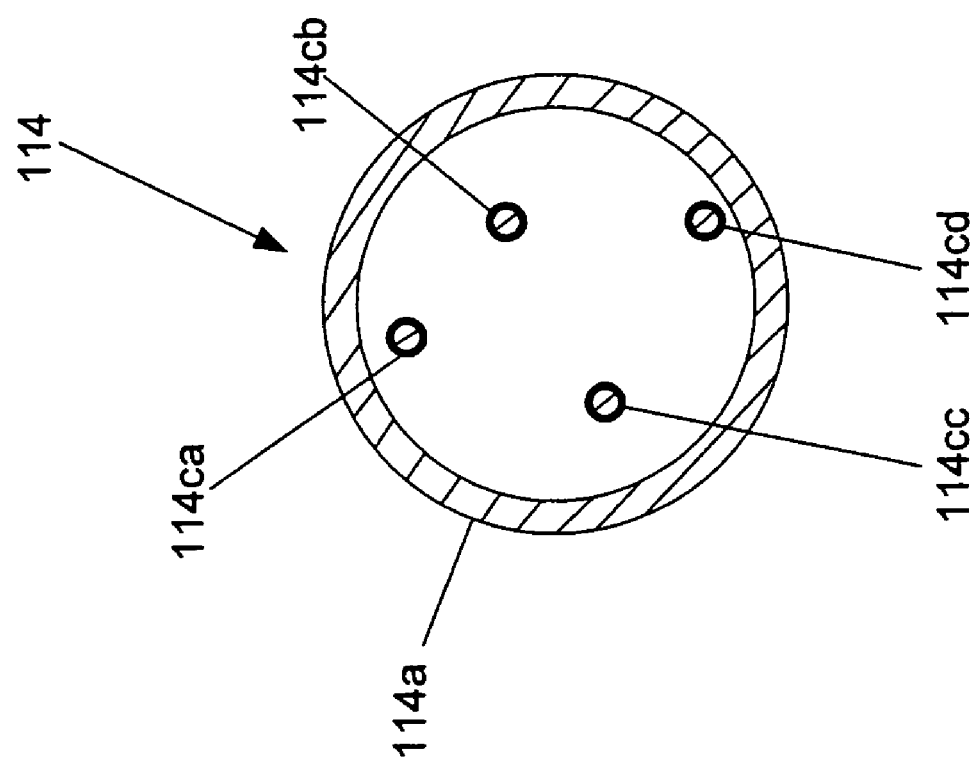
FIG. 11b is an end cross-sectional view of an umbilical.
Figure 12:
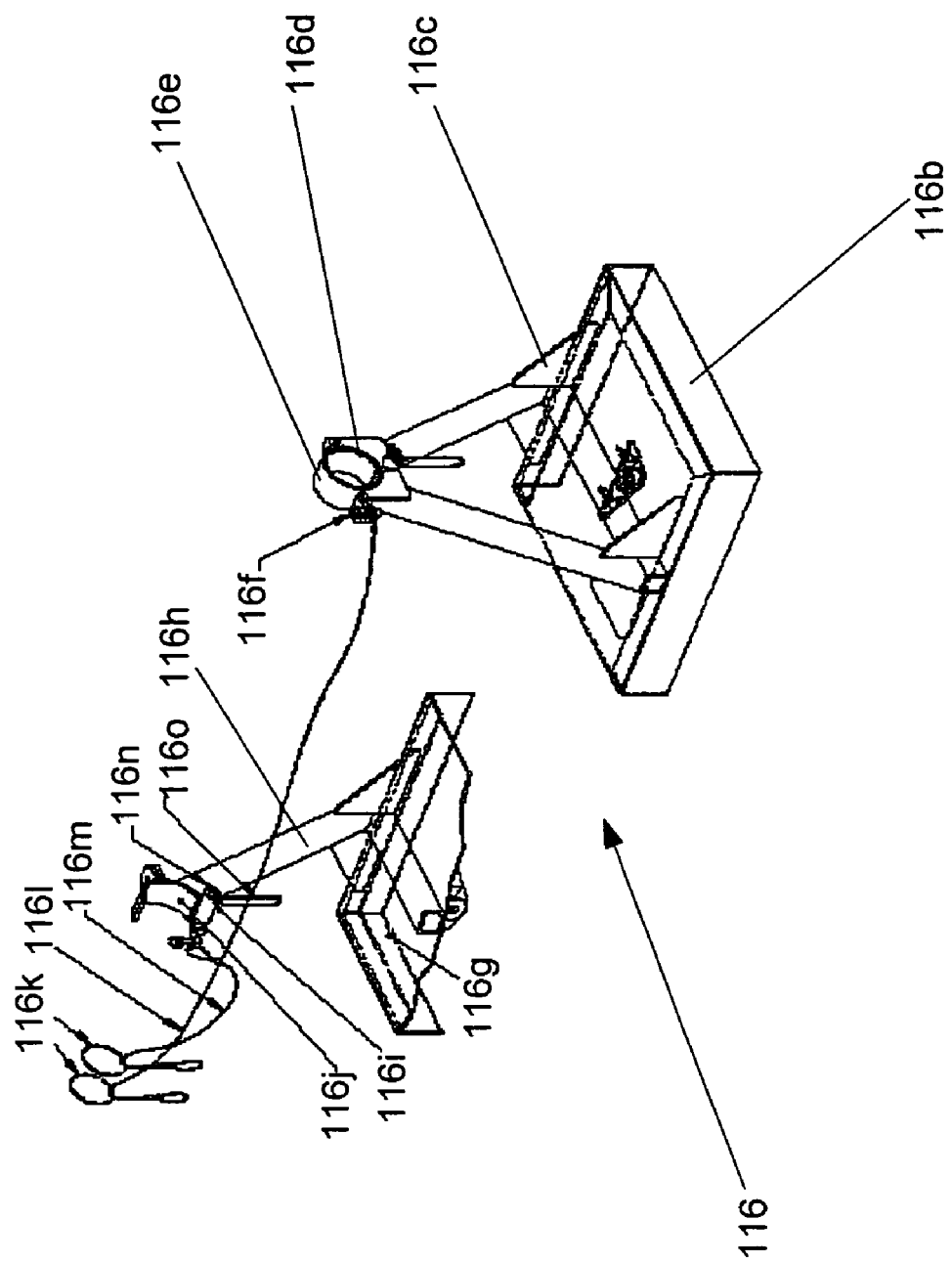
FIG. 12 is a perspective view of a mud mat assembly.
Figure 23:
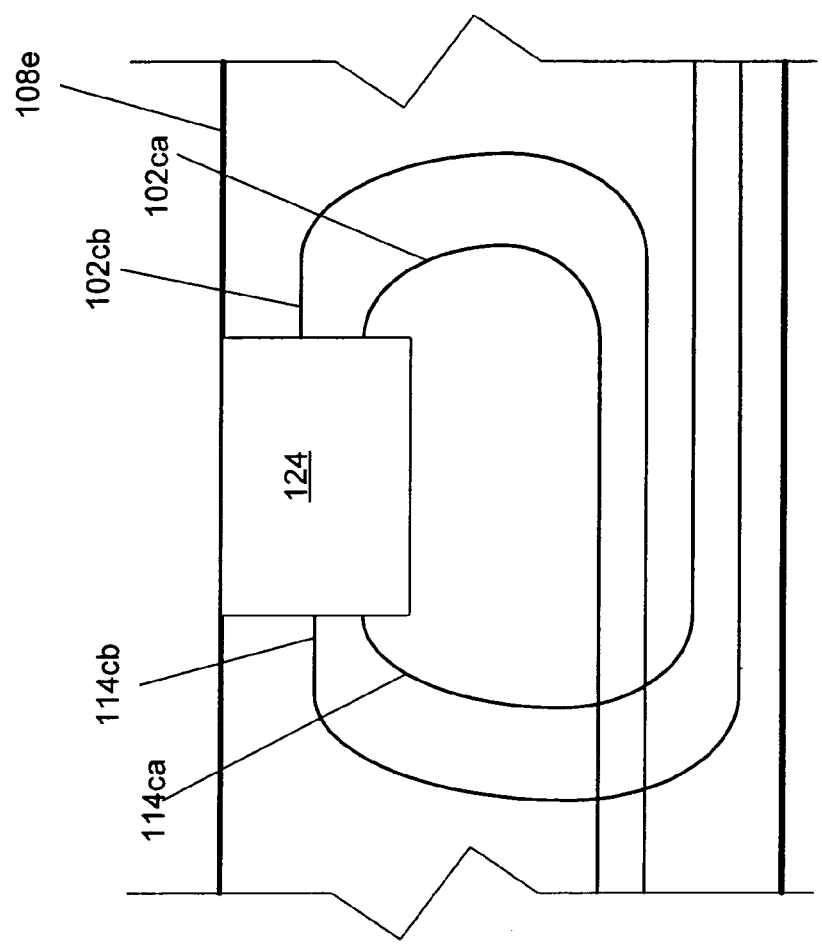
FIG. 23 is a top view of a connector within a compliant splice.

Alternatives:

Referring to FIGS. 2 and 23, in another embodiment, connector 124 connects conduit 102ca to conduit 114ca and conduit 102cb to conduit 114cb, and is positioned between umbilical 102 and umbilical 114, for example, rigidly attached to side section 108e of mid joint 108a of compliant splice. In this embodiment, connector 124 may be adapted for use with conduits 102ca, 102cb, 114ca, and 114cb, for example if conduits 102ca, 102cb, 114ca, and 114cb are electrical wires, then connector 124 would include suitable plugs and connections to connect the electrical wires to each other, or if conduits 102ca, 102cb, 114ca, and 114cb are fiber optics, then connector 124 would include suitable plugs and connections to connect the fibers to each other.

Figure 24A:
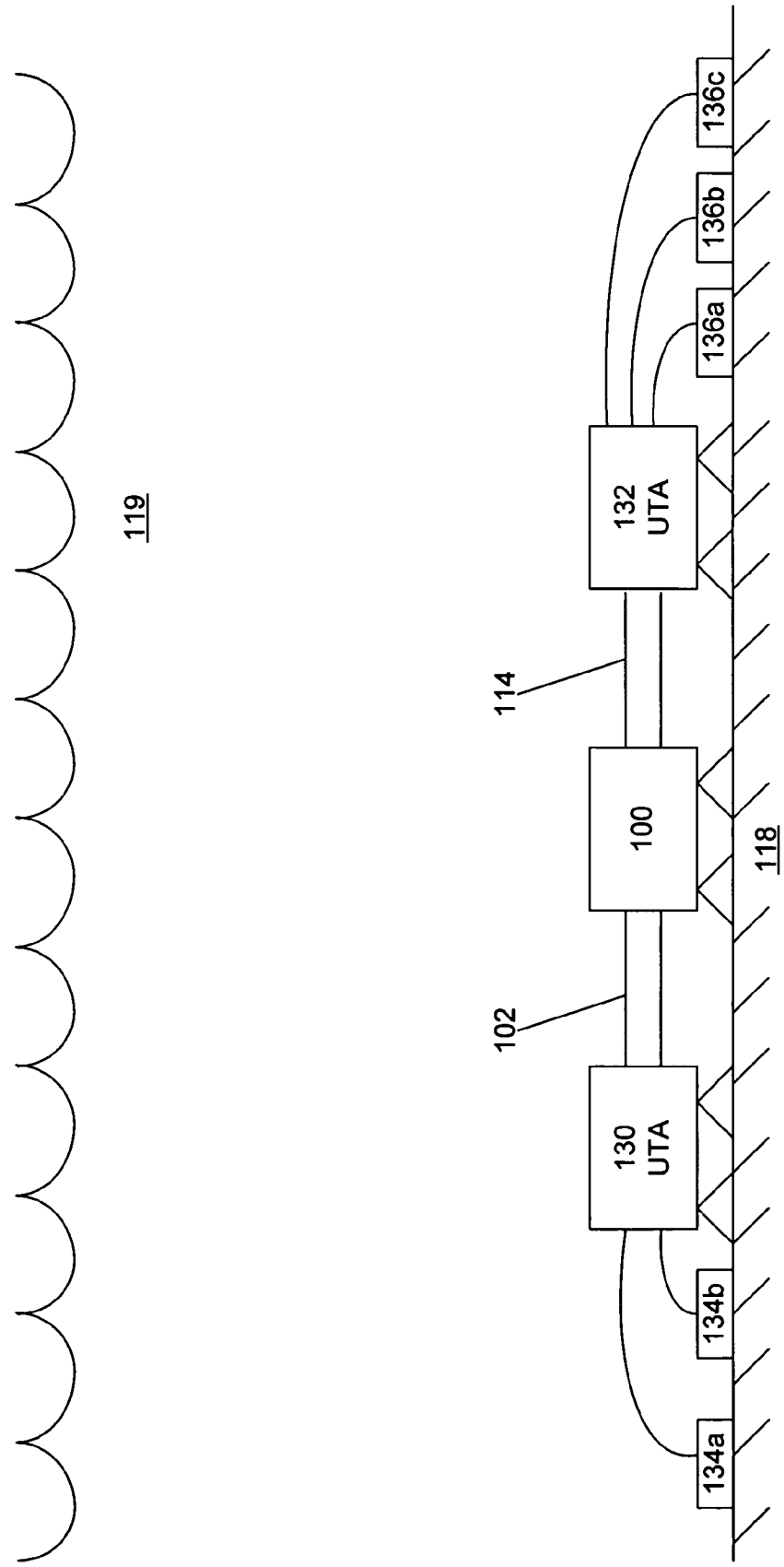
FIG. 24a illustrates a compliant splice system on the ocean floor.

Referring to FIG. 24a, in another embodiment, system 100 is connected to umbilical 102 and umbilical 114. Umbilical 102 is connected to conventional umbilical termination assembly 130, and umbilical 114 is connected to conventional umbilical termination assembly 132. Umbilical termination assembly 130 has connections to wellhead 134a and wellhead 134b. Umbilical termination assembly 132 has connections to wellheads 136a, 136b, and 136c. System 100, umbilical termination assemblies 130, 132, and wellheads 134a, 134b, 136a, 136b, and 136c are resting on ocean floor 118 beneath body of water 119.

Figure 24B:
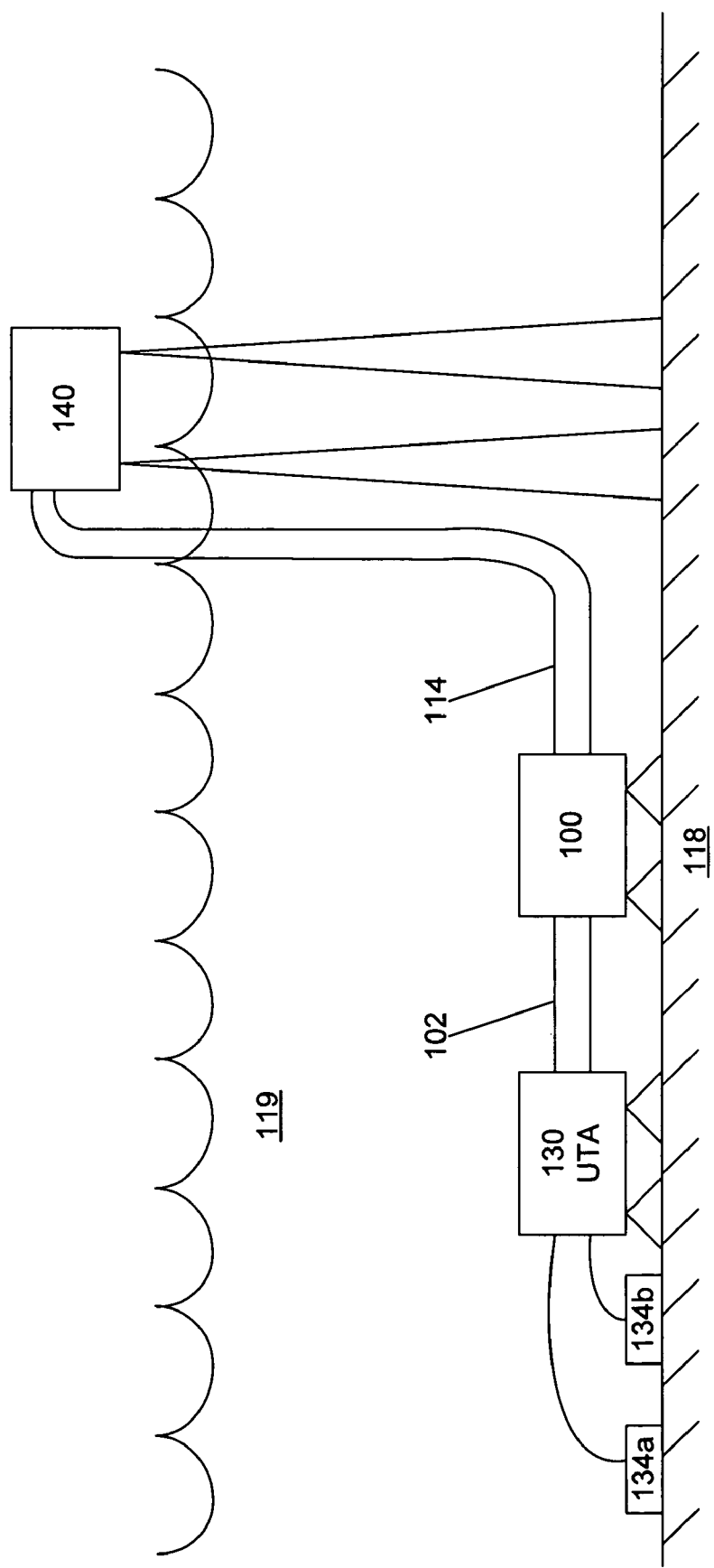
FIG. 24b illustrates a compliant splice system on the ocean floor.

Referring to FIG. 24b, in another embodiment, system 100 is connected to umbilical 102 and umbilical 114. Umbilical 102 is connected to conventional umbilical termination assembly 130, and umbilical 114 is connected to conventional oil platform 140. Umbilical termination assembly 130 has connections to wellhead 134a and wellhead 134b. System 100, umbilical termination assembly 130, and wellheads 134a and 134b are resting on ocean floor 118 beneath body of water 119.

In another embodiment, compliant splice 108 has length L 108x, for example from about 40 to 60 in., or 52.75 in.; height H 108y, for example from about 8 to 15 in., or 11 in.; and width W 108z, for example from about 20 to 40 in., or 27 in.

In one embodiment, system 100 includes umbilical 102 and umbilical 114 laying on ocean floor 118. Bend restrictor assembly 104 is installed about umbilical 102 and bend restrictor assembly 112 is installed about umbilical 114. Optional mud mat assembly 116 is included to lift compliant splice 108 off of ocean floor 118.

Conduit 102ca, conduit 102cb, conduit 114ca, and conduit 114cb may be, for example, electrical cables, fiber-optic cables, and/or pipes or hoses for transmitting fluids or gases. Additional conduits may also be provided within umbilical 102 and umbilical 114 to be connected by compliant splice 108.

In one embodiment, the components of armor pot 110 may be substantially identical in design and operation to the components of armor pot 106.

In one embodiment, the components of bend restrictors 112 may be substantially identical in design and operation to the components of bend restrictor assembly 104.

In one embodiment, the components of second umbilical 114 may be substantially identical in design and operation to the components of first umbilical 102.

In another embodiment, located within compliant splice 108 is connector 124. Connector 124 serves to connect conduit 102ca to conduit 114ca, and conduit 102cb to conduit 114cb, for example for electrical and fiber optic conduits. In another embodiment, conduit 102ca may be directly connected to conduit 114ca, for example by welding, and conduit 102cb may be directly connected to conduit 114cb, for example by welding. In another embodiment, one or more conduits may be directly connected, and one or more other conduits may be connected by connector 124.

Identification 108dc, may include, for example indelible ink markings, a label, or an etching.

In another embodiment, end joint 108b is substantially identical in design and operation to end joint 108c. In another embodiment, top section 108i is substantially identical in design and operation to bottom section 108l. In another embodiment, side section 108j is substantially identical in design and operation to side section 108k. In another embodiment, top section 108d is substantially identical in design and operation to bottom section 108g. In another embodiment, side section 108e is substantially identical in design and operation to side section 108f.

In one embodiment, bend restrictor adapters 104a, 112a may be bolted to flanges 106e, 110e of armor pots 106, 110, respectively. In another embodiment, bend restrictor adapters 104a, 112a may be welded to flanges 106e, 110e of armor pots 106, 110, respectively.

In another embodiment, connector 124 may be a conventional commercially available field installed termination assembly (FITA), for example a FITA commercially available from Ocean Designs Inc. of Houston, Tex.

In another embodiment, umbilicals 102, 114 are conventional commercially available umbilicals, for example umbilicals commercially available from Multiflex of Houston, Tex., or Duco of Houston, Tex., or Kvaerner of Houston, Tex., or Nexans of Houston, Tex.

In another embodiment, bend restrictor assemblies 104, 112 are conventional commercially available bend restrictor assemblies, for example bend restrictor assemblies commercially available from Deep Down of Houston, Tex., or CRP of Houston, Tex., or Kvaerner of Houston, Tex.

In another embodiment, armor pots 106, 110 are conventional commercially available armor pots, for example armor pots commercially available from Deep Down of Houston, Tex., or Nexans of Houston, Tex.

In another embodiment, resin 106n, 110n is conventional commercially available resin, for example Socket Fast commercially available from Holloway Houston, Inc. of Houston, Tex., or Wire Lock commercially available from Holloway Houston, Inc. of Houston, Tex.

In one embodiment, there is disclosed a method including providing a first umbilical, coupling an end of the first umbilical to a first end of a compliant splice system, providing a second umbilical, and coupling an end to the second umbilical to a second end of the compliant splice system. In another embodiment, the method also includes coupling at least one conduit within the first umbilical to at least one conduit within the second umbilical. In another embodiment, the method also includes coupling at least one conduit within the first umbilical to a connector within the compliant splice system, and coupling at least one conduit within the second umbilical to the connector within the compliant splice system. In another embodiment, the method also includes rolling the first umbilical, the compliant splice system, and the second umbilical onto a reel. In another embodiment, the method also includes placing the reel on a ship. In another embodiment, the method also includes lowering the first umbilical, the compliant splice system, and the second umbilical from the reel, over a chute on the ship, and into water. In another embodiment, the method also includes attaching a mud mat assembly to the compliant splice system.

In one embodiment, there is disclosed an apparatus for coupling a first umbilical to a second umbilical, including a first attachment mechanism for attaching the apparatus to the first umbilical, a second attachment mechanism for attaching the apparatus to the second umbilical, and a movable mechanism coupled to the first attachment mechanism and the second attachment mechanism, allowing relative movement between the first umbilical and the second umbilical. In another embodiment, the movable mechanism comprises a plurality of joints which are adapted to rotate relative to one another. In another embodiment, the first attachment mechanism comprises an armor pot. In another embodiment, the second attachment mechanism comprises an armor pot. In another embodiment, the apparatus also includes at least one bend restrictor about the first umbilical adjacent the first attachment mechanism. In another embodiment, the apparatus also includes at least one bend restrictor about the second umbilical adjacent the second attachment mechanism. In another embodiment, the apparatus also includes an adapter to connect the at least one bend restrictor to the first attachment mechanism. In another embodiment, the apparatus also includes an adapter to connect the at least one bend restrictor to the second attachment mechanism. In another embodiment, the movable mechanism comprises a mid joint hingedly connected to a first end joint on a first end, and hingedly connected to a second end joint on a second end. In another embodiment, the first attachment mechanism is connected to the first end joint, and the second attachment mechanism is connected to the second end joint.

In one embodiment, there is disclosed a system including a movable mechanism, a first umbilical, a first attachment mechanism for attaching the movable mechanism to the first umbilical, a second umbilical, a second attachment mechanism for attaching the movable mechanism to the second umbilical, and wherein the movable mechanism allows relative movement between the first umbilical and the second umbilical. In another embodiment, the movable mechanism comprises a plurality of joints which are adapted to rotate relative to one another. In another embodiment, the first attachment mechanism comprises an armor pot. In another embodiment, the second attachment mechanism comprises an armor pot. In another embodiment, the system also includes at least one bend restrictor about the first umbilical adjacent the first attachment mechanism. In another embodiment, the system also includes at least one bend restrictor about the second umbilical adjacent the second attachment mechanism. In another embodiment, the system also includes an adapter to connect the at least one bend restrictor to the first attachment mechanism. In another embodiment, the system also an adapter to connect the at least one bend restrictor to the second attachment mechanism. In another embodiment, the movable mechanism comprises a mid joint hingedly connected to a first end joint on a first end, and hingedly connected to a second end joint on a second end. In another embodiment, the first attachment mechanism is connected to the first end joint, and the second attachment mechanism is connected to the second end joint.

In one embodiment, there is disclosed an apparatus for coupling a first umbilical to a second umbilical, including a first attachment means for attaching the apparatus to the first umbilical, a second attachment means for attaching the apparatus to the second umbilical, and a movable means coupled to the first attachment means and the second attachment means, allowing relative movement between the first umbilical and the second umbilical. In another embodiment, the apparatus also includes a means for coupling at least one conduit within the first umbilical to at least one conduit within the second umbilical. In another embodiment, the apparatus also includes a means for coupling at least one conduit within the first umbilical to a connector within the movable means, and coupling at least one conduit within the second umbilical to the connector within the movable means. In another embodiment, the apparatus also includes a means for rolling the first umbilical, the apparatus, and the second umbilical onto a reel. In another embodiment, the apparatus also includes a means for placing the reel on a ship. In another embodiment, the apparatus also includes a means for lowering the first umbilical, the apparatus, and the second umbilical from the reel, over a chute on the ship, and into water. In another embodiment, the apparatus also includes a means for attaching a mud mat assembly to the apparatus. In another embodiment, the movable means comprises a plurality of joints which are adapted to rotate relative to one another. In another embodiment, the movable means comprises a mid joint hingedly connected to a first end joint on a first end, and hingedly connected to a second end joint on a second end. In another embodiment, the first attachment means is connected to the first end joint, and the second attachment means is connected to the second end joint.

In one embodiment, there is disclosed a method including providing a first umbilical, exposing at least one conduit of the first umbilical, providing a second umbilical, exposing at least one conduit of the second umbilical, connecting the at least one conduit of the first umbilical to the at least one conduit of the second umbilical with a connection, and placing the connection within a compliant housing. In another embodiment, the method also includes coupling the at least one conduit of the first umbilical to a connector within the compliant housing, and coupling the at least one conduit of the second umbilical to the connector within the compliant housing. In another embodiment, the method also includes rolling the first umbilical, the compliant housing, and the second umbilical onto a reel. In another embodiment, the method also includes placing the reel on a ship. In another embodiment, the method also includes lowering the first umbilical, the compliant housing, and the second umbilical from the reel, over a chute on the ship, and into water. In another embodiment, the method also includes attaching a mud mat assembly to the compliant housing. In another embodiment, the method also includes sealing an interface between the first conduit and the compliant housing with a resin, and sealing an interface between the second conduit the compliant housing with a resin.

In one embodiment, there is disclosed a method including providing a first umbilical, coupling an end of the first umbilical to a first end of a compliant splice system, providing a second umbilical, coupling an end of the second umbilical to a second end of the compliant splice system, coupling at least one conduit within the first umbilical to at least one conduit within the second umbilical, rolling the first umbilical, the compliant splice system, and the second umbilical onto a reel, placing the reel on a ship, lowering the first umbilical, the compliant splice system, and the second umbilical from the reel, over a chute on the ship, and into water, and attaching a mud mat assembly to the compliant splice system.

According to another aspect of the present invention, an apparatus for coupling a first umbilical to a second umbilical, including a first attachment mechanism for attaching the apparatus to the first umbilical, a second attachment mechanism for attaching the apparatus to the second umbilical, a movable mechanism coupled to the first attachment mechanism and the second attachment mechanism, allowing relative movement between the first umbilical and the second umbilical, wherein the movable mechanism comprises a plurality of joints which are adapted to rotate relative to one another, wherein the first attachment mechanism comprises an armor pot, wherein the second attachment mechanism comprises an armor pot, further comprising at least one bend restrictor about the first umbilical adjacent the first attachment mechanism, further comprising at least one bend restrictor about the second umbilical adjacent the second attachment mechanism, further comprising an adapter to connect the at least one bend restrictor to the first attachment mechanism, further comprising an adapter to connect the at least one bend restrictor to the second attachment mechanism, wherein the movable mechanism comprises a mid joint hingedly connected to a first end joint on a first end, and hingedly connected to a second end joint on a second end, and wherein the first attachment mechanism is connected to the first end joint, and the second attachment mechanism is connected to the second end joint.

In one embodiment, there is disclosed a system including a movable mechanism, a first umbilical, a first attachment mechanism for attaching the movable mechanism to the first umbilical, a second umbilical, a second attachment mechanism for attaching the movable mechanism to the second umbilical, wherein the movable mechanism allows relative movement between the first umbilical and the second umbilical, wherein the movable mechanism comprises a plurality of joints which are adapted to rotate relative to one another, wherein the first attachment mechanism comprises an armor pot, wherein the second attachment mechanism comprises an armor pot, further comprising at least one bend restrictor about the first umbilical adjacent the first attachment mechanism, further comprising at least one bend restrictor about the second umbilical adjacent the second attachment mechanism, further comprising an adapter to connect the at least one bend restrictor to the first attachment mechanism, further comprising an adapter to connect the at least one bend restrictor to the second attachment mechanism, wherein the movable mechanism comprises a mid joint hingedly connected to a first end joint on a first end, and hingedly connected to a second end joint on a second end, and wherein the first attachment mechanism is connected to the first end joint, and the second attachment mechanism is connected to the second end joint.

In one embodiment, there is disclosed an apparatus for coupling a first umbilical to a second umbilical, including a first attachment means for attaching the apparatus to the first umbilical, a second attachment means for attaching the apparatus to the second umbilical, a movable means coupled to the first attachment means and the second attachment means, allowing relative movement between the first umbilical and the second umbilical, a means for coupling at least one conduit within the first umbilical to at least one conduit within the second umbilical, a means for coupling at least one conduit within the first umbilical to a connector within the movable means, and coupling at least one conduit within the second umbilical to the connector within the movable means, a means for rolling the first umbilical, the apparatus, and the second umbilical onto a reel, a means for placing the reel on a ship, a means for lowering the first umbilical, the apparatus, and the second umbilical from the reel, over a chute on the ship, and into water, a means for attaching a mud mat assembly to the apparatus, wherein the movable means comprises a plurality of joints which are adapted to rotate relative to one another, wherein the movable means comprises a mid joint hingedly connected to a first end joint on a first end, and hingedly connected to a second end joint on a second end, and wherein the first attachment means is connected to the first end joint, and the second attachment means is connected to the second end joint. According to another aspect of the present invention, a method including providing a first umbilical, exposing at least one conduit of the first umbilical, providing a second umbilical, exposing at least one conduit of the second umbilical, connecting the at least one conduit of the first umbilical to the at least one conduit of the second umbilical with a connection, placing the connection within a compliant housing, coupling the at least one conduit of the first umbilical to a connector within the compliant housing, and coupling the at least one conduit of the second umbilical to the connector within the compliant housing, rolling the first umbilical, the compliant housing, and the second umbilical onto a reel, placing the reel on a ship, lowering the first umbilical, the compliant housing, and the second umbilical from the reel, over a chute on the ship, and into water, attaching a mud mat assembly to the compliant housing, and sealing an interface between the first conduit and the compliant housing with a resin, and sealing an interface between the second conduit the compliant housing with a resin.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A flexible splice to join an end of a first elongate subsea umbilical to an end of a second elongate subsea umbilical creating a single elongate subsea umbilical with sufficient flexibility to be coiled around a single reel prior to deployment subsea, the flexible splice comprising;
   a first armor pot sized and arranged to receive and engage the end of the first elongate subsea umbilical;
   a first bend restrictor assembly connected to and extending from the first armor pot to surround and protect a portion of the first elongate subsea umbilical proximate the first armor pot;
   a second armor pot sized and arranged to receive and engage the end of the second elongate subsea umbilical;
   a second bend restrictor assembly connected to and extending from the second armor pot to surround and protect a portion of the second elongate subsea umbilical proximate the second armor pot;
   a plurality of flexible conduits, positioned between the first armor pot and the second armor pot, each of the flexible conduits in fluid communication with a like conduit in both the first elongate subsea umbilical and the second elongate subsea umbilical;
   the flexible splice having a first end joint assembly, a midjoint assembly and a second end joint assembly, the first end joint assembly sized and arranged to receive and connect to the first armor pot and the second end joint assembly sized and arranged to receive and connect to the second armor pot; and the mid-joint assembly flexibly connected by a hinge on one end to the first end joint assembly and flexibly connected by a hinge on the other end to the second end joint assembly to allow the flexible splice to flex sufficiently to allow the first and second elongate subsea umbilicals to be wound on the single reel.

* * * * *